(12) United States Patent
Ozue et al.

(10) Patent No.: US 7,324,303 B2
(45) Date of Patent: Jan. 29, 2008

(54) MAGNETIC RECORDING/REPRODUCING HEAD WITH HEAD ELEMENTS DISPLACED IN BOTH HEAD WIDTH AND LAMINATION DIRECTIONS

(75) Inventors: Tadashi Ozue, Kanagawa (JP); Yutaka Soda, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 11/653,806

(22) Filed: Jan. 16, 2007

(65) Prior Publication Data

US 2007/0109682 A1    May 17, 2007

Related U.S. Application Data

(62) Division of application No. 11/103,211, filed on Apr. 11, 2005, now abandoned, which is a division of application No. 10/431,834, filed on May 8, 2003, now abandoned.

(30) Foreign Application Priority Data

May 15, 2002    (JP) .......................... P2002-140556

(51) Int. Cl.
G11B 5/265    (2006.01)
G11B 5/29    (2006.01)
G11B 5/31    (2006.01)
G11B 5/39    (2006.01)

(52) U.S. Cl. .................. 360/121; 360/126; 360/316; 360/317

(58) Field of Classification Search ................ 360/121, 360/126, 129, 314, 315, 316, 317, 318, 318.1
See application file for complete search history.

(56) References Cited

U.S. PATENT DOCUMENTS

| 4,901,178 | A | 2/1990 | Kobayashi et al. |
| 5,331,493 | A | 7/1994 | Schwarz |
| 5,335,127 | A | 8/1994 | Nagata et al. |
| 6,236,538 | B1 | 5/2001 | Yamada et al. |
| 6,344,951 | B1 | 2/2002 | Sato et al. |
| 6,369,992 | B1 | 4/2002 | Yoda et al. |
| 6,646,830 | B2 | 11/2003 | Biskeborn et al. |
| 6,704,178 | B2 | 3/2004 | Nakashio et al. |
| 6,778,359 | B1 | 8/2004 | Iwama |
| 6,826,020 | B2 | 11/2004 | Daby et al. |

FOREIGN PATENT DOCUMENTS

| JP | 01137421 | 5/1989 |
| JP | 01169714 | 7/1989 |
| JP | 09016910 | 1/1997 |
| JP | 09138912 | 5/1997 |
| JP | 2001184610 | 7/2001 |

*Primary Examiner*—Craig A. Renner
(74) *Attorney, Agent, or Firm*—Lerner, David, Littenberg, Krumholz & Mentlik, LLP

(57) ABSTRACT

A magnetic recording/reproducing head having a plurality of magnetic head elements for multi-channeling capable of achieving high density recording/reproducing capability, including: a plurality of magnetic recording/reproducing head layers each including magnetic recording/reproducing head elements fabricated by a thin film process and interposed between two insulating/magnetic shielding layers laminated on a non-magnetic substrate; the total of magnetic recording/reproducing head elements formed therein are displaced from each other in a head width direction, and each magnetic recording/reproducing head layer has a plurality of magnetic recording/reproducing head elements formed at a predetermined pitch.

2 Claims, 16 Drawing Sheets

MAGNETIC RECORDING/REPRODUCING HEAD WITH HEAD ELEMENTS DISPLACED IN BOTH HEAD WIDTH AND LAMINATION DIRECTIONS

CROSS REFERENCE TO RELATED APPLICATIONS

This application is a divisional of U.S. application Ser. No. 11/103,211, filed on Apr. 11, 2005 now abandoned, which is a divisional of application Ser. No. 10/431,834, filed on May 8, 2003 now abandoned, the disclosure of which is incorporated herein by reference.

BACKGROUND OF THE INVENTION

1. Field of the Invention

The present invention relates to a magnetic recording head, a magnetic reproducing head, a magnetic head, a tape drive and a disk drive using a similar, and in particular, relates to a technology for facilitating arrangement of a plurality of magnetic heads (including both magnetic recording heads and magnetic reproducing heads) (hereinafter referred to as multiplicity of magnetic heads) in order to achieve higher recording density.

2. Description of the Related Art

Recently, in order to realize large capacity of storage for magnetic recording media, an increasingly higher recording density is required for magnetic heads, so that the use of magnetic heads suitable for reducing a recording track width thereof (hereinafter referred to as "width reduction") has been increasing.

Further, in order to realize a large capacity storage and a high density in magnetic recording and reproducing of information, provision of a multiplicity of channels is desired (hereinafter referred to as a "multi-channeling"), and hence a multi-channeled magnetic head is on demand.

As an example of such type of a multi-channeled magnetic head, there is, for example, a head that is formed by laminating a plurality of magnetic recording head elements or magnetic reproducing head elements on one common substrate via a magnetic shielding layer, an insulating layer and the like has been proposed by the present applicant of the present invention.

A magnetic head disclosed in the JP-A Laid-Open No. 2001-6750 is directed to a magnetic recording head, and a magnetic head disclosed in the JP-A Laid-Open No. 2000-348377 is directed to a magnetic reproducing head.

Both of those magnetic heads mentioned above are formed by laminating a plurality of magnetic recording head layers or magnetic reproducing head layers, each layer including a single magnetic head element, on a substrate made of a non-magnetic substance, and displacing all magnetic head elements from each other in an orthogonal direction relative to a direction of lamination thereof (herein after referred to as a "head width direction").

As a result, multi-channeling of the magnetic head is enabled, and each magnetic head element is placed in proximity or overlapped in the direction of the head width thereby enabling to respond to narrower recording track.

The number of channels required for a magnetic recording medium nowadays is not limited to 2 channels or 4 channels, but several tens of channels, for example, 40 channels or more are demanded. This is because that in the field of information recording, a further speedup in recording speed and/or reproducing speed is desired, thereby necessitating a provision of a greater multiplicity of channels for recording and reproducing information to and from a recording medium.

SUMMARY OF THE INVENTION

In the above-mentioned magnetic recording head or the magnetic reproducing head, if a magnetic head having, for example, 40 channels is to be fabricated, magnetic head layers each having a magnetic head element must be laminated as many as 40 layers.

However, when a plurality of magnetic head layers are laminated, there occurs a problem that, due to an error in accuracy of positioning (alignment error) between each magnetic head element in its width direction, a displacement between the top magnetic head element and the bottom magnetic head element in the head width direction becomes considerably large.

In other words, when forming a magnetic head element having a head width of, for example, 1 µm, an alignment error between two magnetic head elements adjacent in the direction of lamination is considered to be approximately 0.05 µm.

This is caused by the fact that, when forming magnetic head elements by a thin film processing, each layer thereof is formed by masking with a mask and depositing a film, however, there is a limit to securing accuracy in positioning of each masking in the lamination.

Then, for example, in the case described above in which the magnetic head layers having the magnetic head element having the head width of 1 µm are laminated as many as 40 layers, a maximum displacement between the uppermost and the bottom magnetic head elements becomes:

$$0.05 \text{ µm} \times 40 = 2 \text{ µm},$$

Hence, a ratio of displacement relative to the width of the magnetic head element (equal to a track width in the case of the magnetic recording head element) becomes substantially large so that it cannot be ignored.

As a result, there is a limit to the number of laminations allowable for the magnetic head layers, thereby preventing the multi-channeling, and in consequence, the higher recording density and reproducing of information.

The present invention has been contemplated in view of the above-mentioned problems associated with the conventional technology, and to achieve a further improvement in the recording and reproducing density by an increased multi-channeling of the magnetic head elements.

A magnetic recording head according to a preferred embodiment of the present invention includes a plurality of magnetic recording head layers laminated on a substrate made of a non-magnetic material, each of the plurality of magnetic recording head layers including magnetic recording head elements fabricated by a thin film process and interposed between two insulating layers, and all of the magnetic recording head elements being displaced from each other in a head width direction constituting an orthogonal direction relative to a direction of lamination, the plurality of magnetic recording head layers comprising a plurality of magnetic recording head elements formed at a predetermined pitch.

According to another preferred embodiment of the present invention, there is provided a tape drive having a magnetic recording head for recording a signal on a recording medium in tape form and a tape running means for running the recording medium in tape form along a predetermined run path; the magnetic recording head includes a plurality of magnetic recording head layers laminated on a substrate made of a non-magnetic material, each of the plurality of magnetic recording head layers including magnetic recording head elements interposed between two insulating layers, all of the magnetic recording head elements formed therein being displaced from each other in a head width direction constituting an orthogonal direction relative to a direction of lamination thereof; and said plurality of magnetic recording head layers includes a plurality of magnetic recording head elements formed at a predetermined pitch.

As a result, according to the preferred embodiments of the present invention, as the plurality of magnetic recording head elements are formed at a predetermined pitch in each magnetic recording head layer, recording tracks are formed on the recording medium using a number of magnetic reproducing head elements corresponding to an integer multiple (two or more) of the number of laminations.

As a result, according to the preferred embodiments of the present invention, as the plurality of magnetic recording head elements are formed at a predetermined pitch in each magnetic recording head layer, a width of each magnetic recording head element can be reduced and an alignment error between each recording head elements can be minimized, thereby enabling recording further narrower recording tracks with higher density, hence permitting realizing a multi-channeling capability for the magnetic recording head.

Further, a magnetic reproducing head device according to another preferred embodiment of the present invention is provided, including a plurality of magnetic reproducing head layers laminated on a substrate made of a non-magnetic material, each of the plurality of the magnetic reproducing head layers including magnetic reproducing head elements fabricated by a thin film process and interposed between two magnetic shielding layers, and all of the magnetic reproducing head elements being displaced from each other in a head width direction constituting an orthogonal direction relative to a direction of lamination; the plurality of magnetic reproducing head layers including a plurality of magnetic reproducing head elements formed at a predetermined pitch.

According to still another preferred embodiment of the present invention, a tape drive apparatus is provided having a magnetic reproducing head for reproducing a signal from a recording medium in tape form and a tape running means for running the recording medium in tape form along a predetermined transport path; the magnetic reproducing head includes a plurality of magnetic reproducing head layers laminated on a substrate made of a non-magnetic material, each of the plurality of magnetic reproducing head layers having magnetic reproducing head elements fabricated by a thin film process and interposed between two magnetic shielding layers, and all of the magnetic reproducing head elements formed therein being displaced from each other in a head width direction constituting an orthogonal direction relative to the direction of lamination thereof, and the magnetic reproducing head layers include a plurality of magnetic reproducing head elements formed at a predetermined pitch.

As a result, according to this preferred embodiment of the present invention, as the plurality of magnetic reproducing head elements are formed at a predetermined pitch in each magnetic reproducing head layer, reproduction of information from recording tracks is performed by use of a number of magnetic reproducing head elements corresponding to an integer multiple (two or more) of the number of laminations.

Further, according to this preferred embodiment of the present invention, as the plurality of magnetic reproducing head elements is formed at a predetermined pitch by the thin film process in each magnetic reproducing head layer, a width of each magnetic reproducing head element can be reduced, and an alignment error between each magnetic reproducing head element can be minimized, thereby enabling to reproduce information from further narrower recording tracks with higher density.

According to still another preferred embodiment of the present invention, in a magnetic reproducing head, any two magnetic reproducing head elements adjacent in the direction of lamination via a magnetic shielding layer share a common magnetic shielding layer existing there between, thereby capable of omitting one step of the lamination processes hence achieving a cost reduction.

Still further, a magnetic reproducing head according to still another preferred embodiment of the present invention, in which two magnetic reproducing head elements adjacent in the direction of lamination via magnetic shielding layers, further has an insulting layer interposed between two magnetic shielding layers existing between the two magnetic reproducing head elements, thereby enabling to eliminate a crosstalk there between, thus permitting achieving higher density.

Further, a magnetic head according to another preferred embodiment of the present invention includes a plurality of magnetic reproducing head layers each having magnetic reproducing head elements fabricated by a thin film process and interposed between two magnetic shielding layers and a plurality of magnetic recording head layers each having magnetic recording head elements fabricated by a thin film process and interposed between two insulating films, laminated on a substrate made of a non-magnetic material, and all of the magnetic reproducing head elements being displaced from each other in a head width direction constituting an orthogonal direction relative to a direction of lamination thereof; the magnetic reproducing head layers comprise a plurality of magnetic reproducing head elements formed at a predetermined pitch; the magnetic recording head layers has a plurality of magnetic recording head elements formed at a same pitch as the plurality of magnetic reproducing head elements; and each magnetic reproducing head element and each magnetic recording head element are formed approximately at a similar position in the head width direction, forming a pair.

Still further, a tape drive according to still another preferred embodiment of the present invention is provided with a magnetic head for recording and reproducing a signal to and from a recording medium in tape form, and a tape running means for running the recording medium in tape form along a predetermined running path; the magnetic head includes a plurality of magnetic reproducing head layers each having magnetic reproducing head elements fabricated by a thin film process and interposed between two magnetic shielding layers, and a plurality of magnetic recording head layers each having magnetic recording head elements fabricated by a thin film process and interposed between two insulating layers, laminated on a substrate made of a non-magnetic material, all of the magnetic reproducing head elements therein being displaced from each other in a head width direction constituting an orthogonal direction relative to the direction of lamination, and all of the magnetic recording head elements therein being displaced from each other in the head width direction; each magnetic reproducing head layer includes a plurality of magnetic reproducing head elements formed at a predetermined pitch; each magnetic recording head layer includes a plurality of magnetic recording head elements formed at a similar pitch as that of the plurality of the magnetic reproducing head elements, and each magnetic reproducing head element and each magnetic recording head element are formed approximately at a similar position in the head width direction, forming a pair.

A disk drive according to still another preferred embodiment of the present invention is provided with a magnetic head for recording and reproducing a signal to and from a disk-shaped recording medium, and a drive mechanism for rotating the disk-shaped recording medium; the magnetic head includes: a plurality of magnetic reproducing head layers each including magnetic reproducing head elements fabricated by a thin film process and interposed between two magnetic shielding layers; and a plurality of magnetic recording head layers each including magnetic recording head elements fabricated by a thin film process and interposed between two insulating layers, both being laminated on a substrate made of a non-magnetic material, all of the magnetic reproducing head elements formed therein being displaced from each other in a head width direction constituting an orthogonal direction relative to a direction of lamination, and all of the magnetic recording head elements formed therein being displaced from each other in the head width direction; each magnetic reproducing head layer includes a plurality of magnetic reproducing head elements formed at a predetermined pitch; each magnetic recording head layer includes a plurality of magnetic recording head elements formed at a similar pitch as that of the plurality of magnetic reproducing head elements; and each magnetic reproducing head element and each magnetic recording head element are formed approximately at a similar position in the head width direction, forming a pair.

As a result, according to the preferred embodiments of the present invention, in each magnetic head layer, there are provided a plurality of magnetic reproducing head elements or a plurality of magnetic recording head elements formed at a predetermined pitch respectively, thereby the magnetic head having a number of the magnetic reproducing heads and the magnetic recording heads corresponding to an integer multiple of the number of laminations (two or more) in order to reproduce and record information to and from recording tracks.

According to the preferred embodiments of the present invention, as in respective magnetic head layers there is provided a plurality of magnetic reproducing head elements and a plurality of magnetic recording head elements, formed at a predetermined pitch, a width of each magnetic recording head element and each magnetic reproducing head element can be reduced, and alignment errors between respective magnetic recording head elements or respective magnetic reproducing head elements can be minimized, thereby enabling to record and reproduce information to and from narrower and higher density recording tracks, thereby providing a magnetic recording and reproducing head capable of coping with a trend towards an ever increasing multi-channeling.

In addition, according to the preferred embodiments of the present invention, magnetic reproducing head layers and magnetic recording head layers are alternately laminated to provide a pair of a magnetic reproducing head element and a magnetic recording head element adjacent in the direction of lamination via a magnetic shielding layer and an insulating layer, and the pair of the magnetic recording head elements and the magnetic reproducing head elements residing in a magnetic recording head layer and in a magnetic reproducing head layer respectively adjacent to each other in the direction of lamination, both of the pair can be formed in proximity to each other, thereby enabling to minimize an alignment error in the head width direction between each magnetic recording head element and each reproducing head element of the pair.

According to the preferred embodiments of the present invention, as after a plurality of magnetic reproducing head layers are laminated to form a magnetic reproducing head layer group, a plurality of magnetic recording head layers are laminated to form a magnetic recording head group, then, the magnetic reproducing head layer group and the magnetic recording head layer group are laminated, a manufacturing process thereof is substantially simplified.

In other words, as environmental conditions such as temperature at the time of manufacture of the magnetic recording head layer or of the magnetic reproducing head layer differ, if it is arranged so as to change the environment after completion of the manufacture of the magnetic recording head layer for a subsequent manufacture of the magnetic reproducing head layer, an alteration cycle of the process environment can be reduced to once, thereby substantially simplifying the manufacturing process.

BRIEF DESCRIPTION OF THE DRAWINGS

The above and other objects, features and advantages of the present invention will become more apparent from the following description of the presently preferred exemplary preferred embodiment of the present invention taken in conjunction with the accompanying drawings, in which.

DETAILED DESCRIPTION OF THE PREFERRED EMBODIMENTS

By referring to the accompanying drawings, preferred embodiments of the present invention are described in detail.

First, an overview of a conventional tape drive will be described by referring to FIG. 1.

Figure 1:
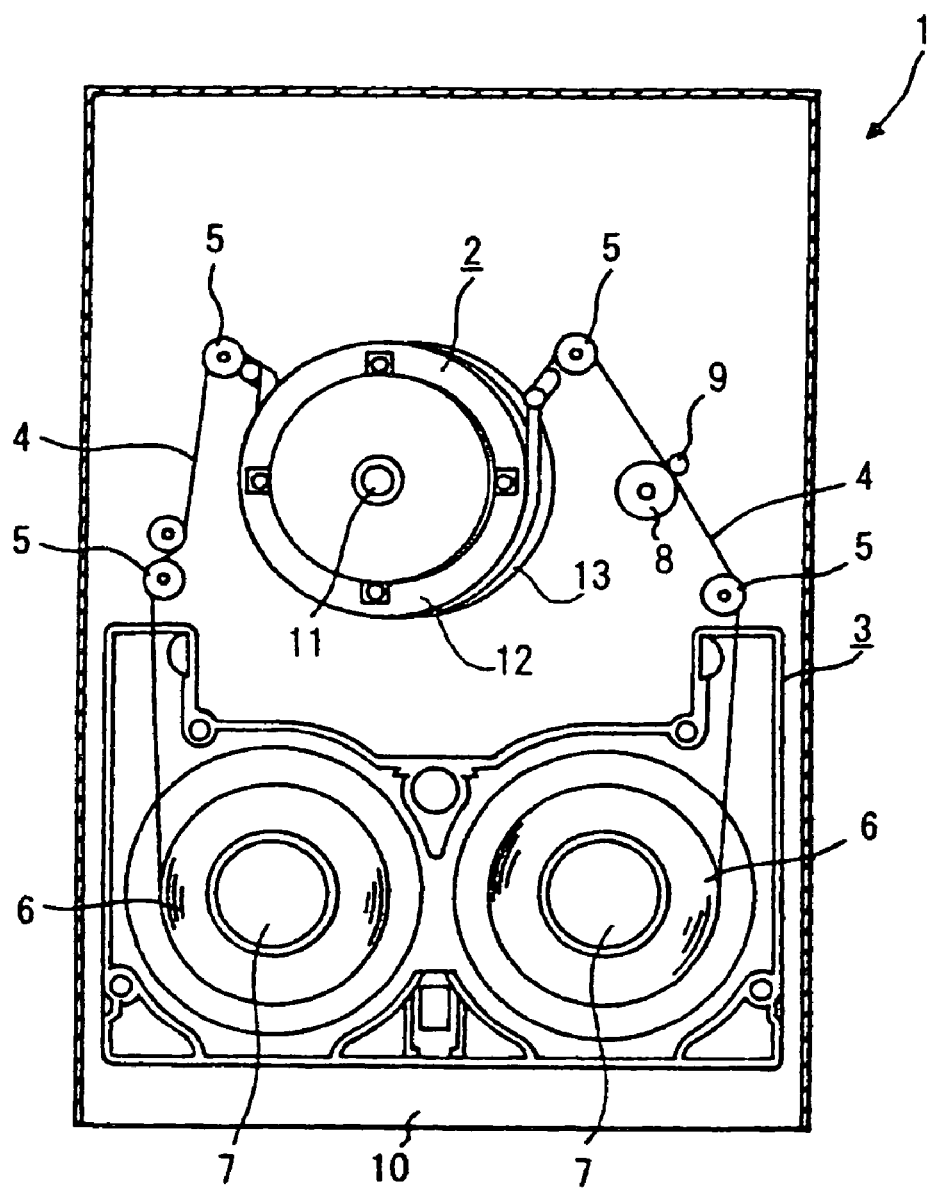
FIG. 1 is a schematic plan view depicting a conventional a tape drive apparatus.

A tape drive 1 is provided with: a rotary drum unit 2; guide pins 5, 5, . . . which form a predetermined tape path for a tape-form recording medium 4 by pulling it out from a tape cassette 3 and winding around the rotary drum unit 2; reel tables 7, 7 for supporting reels 6, 6 of the tape cassette 3; a capstan axis 9 for running the tape-form recording medium 4 in collaboration with a pinch roller 8, and so on, as shown in FIG. 1.

The rotary drum unit 2 is mounted with its axial center slightly slanting relative to the plane of a chassis 10, and when a tape cassette 3 is loaded, its tape-form recording medium 4 is pulled out toward the rotary drum unit 2 by the guide pins 5, 5, . . . to be wound around the rotary drum 2, and at a similar time, the tape-form recording medium 4 is gripped between the pinch roller 8 and the capstan axis 9 thereby forming a tape run path, as shown in FIG. 1.

FIG. 1 schematically illustrates a state in which the tape cassette 3 is loaded in the tape drive apparatus 1 and the tape path is formed.

After the tape path is formed, when the rotary drum 2 and the capstan axis 9 are rotated, the tape-form recording medium 4 is caused to run along the tape run path at a constant speed.

By way of example, the above-mentioned parts such as "guide pins 5, pinch roller 8, capstan axis 9" correspond to "a tape running means for running a recording medium in tape form along a predetermined running path" as will be described later.

The rotary drum unit 2 described above is provided with a stationary axis 11 mounted on the chassis 10, a rotary drum 12 rotatably supported by the stationary axis 11 via a bearing (not shown), and a stationary drum 13 disposed under the rotary drum 12 and fixed to the chassis 10, the stationary drum 13 and the rotary drum 12 being mounted opposing to each other and having a predetermined clearance there between; a notch (not shown) is formed in a bottom edge portion in a perimeter of the rotary drum 12, and in the notch there are disposed a magnetic recording head 20, a magnetic reproducing head 40 or a magnetic head 60, described later.

FIG. 2 to FIG. 5 show a first exemplary preferred embodiment of the present invention, in which a magnetic recording head 20 having eight pieces of magnetic recording head elements is mounted on its rotary drum 2.

Figure 2:
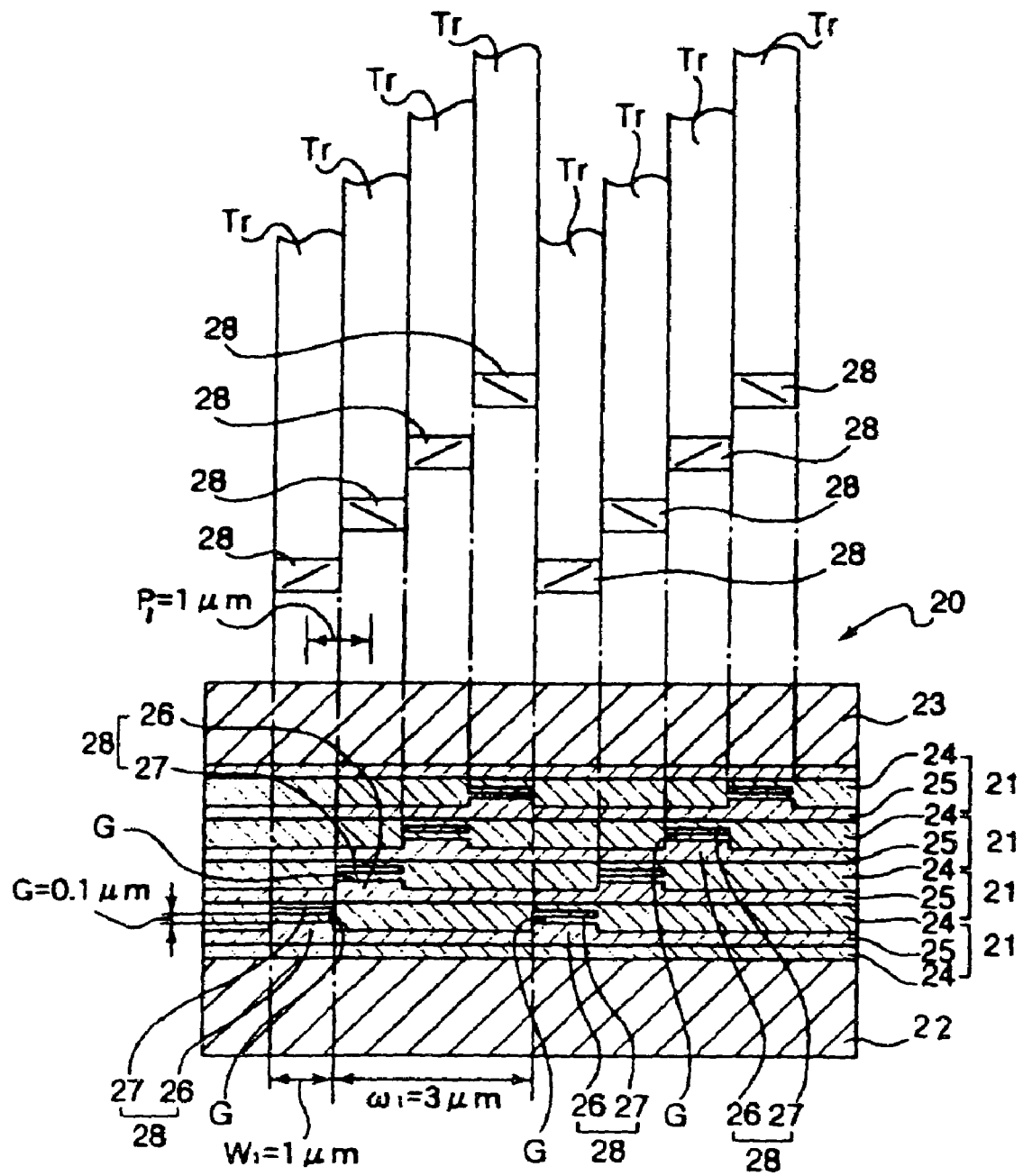
FIG. 2 shows, together with FIGS. 3 to 5, a first exemplary preferred embodiment of the present invention, and in particular, it depicts a relationship between a magnetic recording head and recording tracks.

FIG. 2, which is a schematic diagram of an enlarged portion of the magnetic recording head 20, shows a frontal view as seen from a side thereof in contact with the tape-form recording medium 4.

The magnetic recording head 20, as shown in FIG. 2, is formed by sequentially laminating four layers of magnetic recording head layers 21, 21, . . . on a bottom non-magnetic substrate 22, and an upper non-magnetic substrate 23 on the uppermost magnetic recording head layer 21.

Each magnetic recording head layer 21 has two insulating layers 24, 24 and a magnetic film layer 25 interposed between these insulating layers 24, 24, wherein a bottom magnetic pole 26 is formed on the magnetic film layer 25 partially protruding in an upper direction as viewed from the front side, and an upper magnetic pole 27 formed over the bottom magnetic pole 26 spaced apart therefrom with a predetermined distance (hereinafter referred to as gap) G, which in combination form a magnetic recording head element 28 as shown in FIG. 2.

Figure 3:
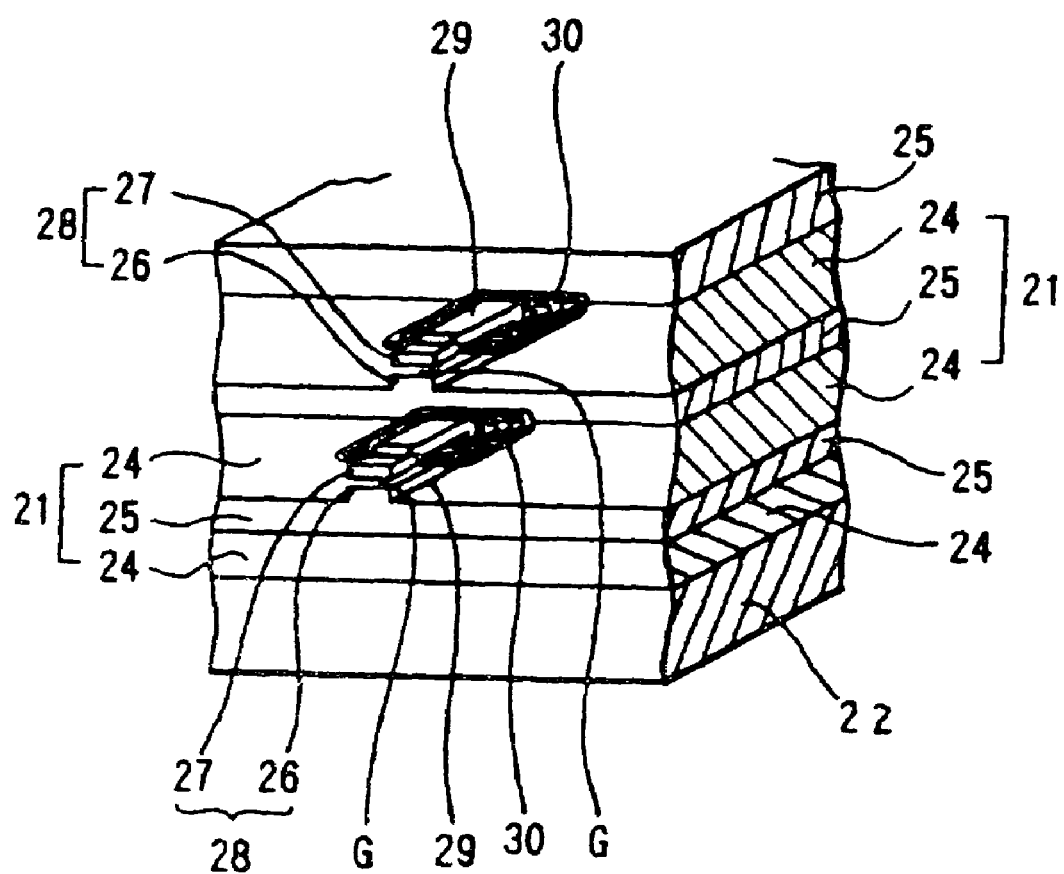
FIG. 3 is a schematic perspective view of a cut-out portion of the magnetic recording head.
Figure 4:
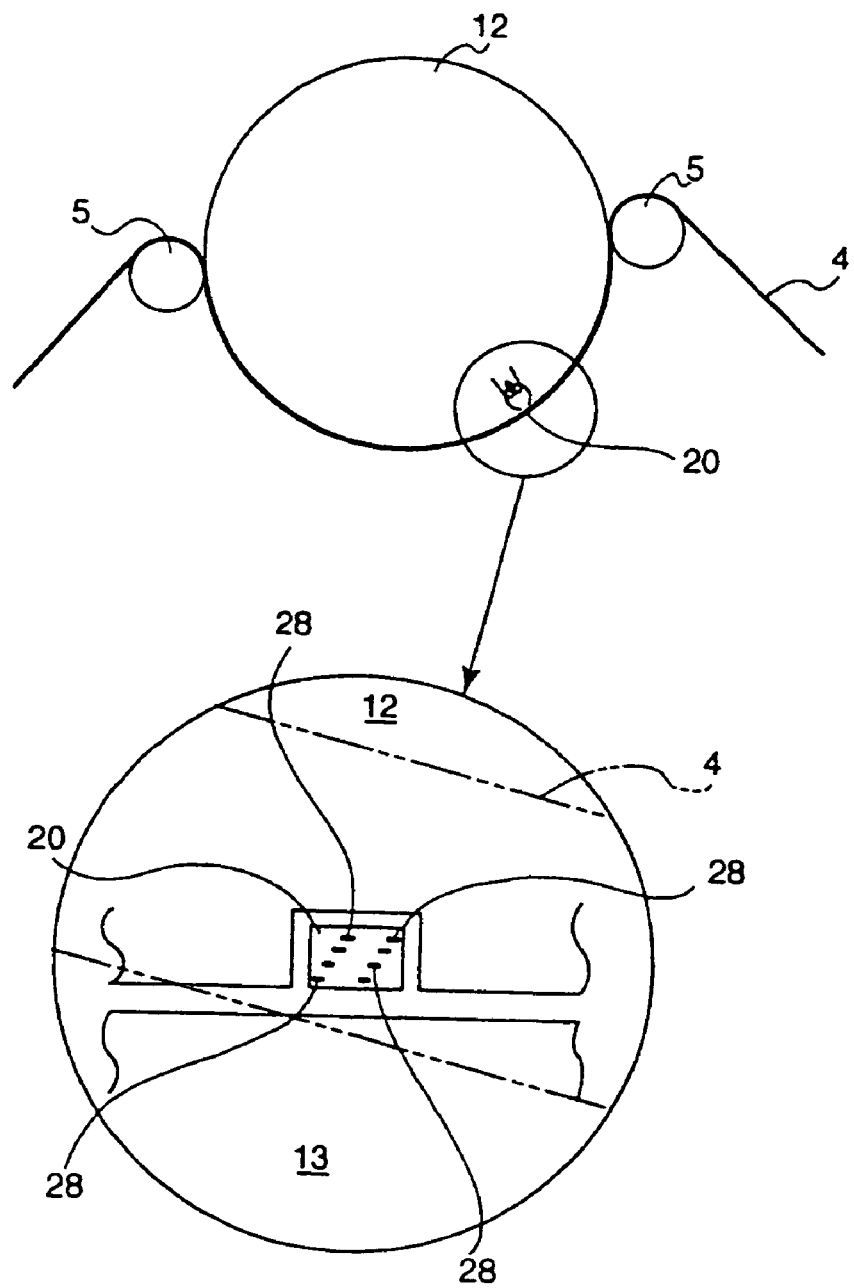
FIG. 4 is a schematic plan view of a rotary drum.

More specifically, the magnetic recording head element 28 is formed by winding a coil 30 around a core 29 formed in a U-shape as viewed from a lateral direction, wherein the upper and bottom end portions of the core 29 correspond to the upper pole piece 27 and the bottom pole piece 26, as illustrated in FIG. 3.

By applying a current through the coil 30, a magnetic field is induced in the gap G between the upper pole piece 26 and the bottom pole piece 27, thereby enabling to form a record track Tr in the tape-form recording medium 4 running in contact with or in proximity to the gap G as shown in FIG. 2.

This magnetic recording head element 28 is formed to have a width (head width $W_1$), for example, $W^1 = 1$ μm, and a gap G of G=0.1 μm (see FIG. 2).

The bottom and the upper non-magnetic substrates 22 and 23 are made of AlTiC, for example. The insulating layers 24, 24, . . . are made of, for example, $Al_2O_3$. Further, the magnetic thin film layer 25 is preferably made of a ferromagnetic material such as, for example, Ni—Fe (Permalloy), Si—Al—Fe (Sendust), amorphous iron core material (highly magnetically permeable thin film) and the like.

In one magnetic recording head layer 21 there are disposed two magnetic recording head elements 28, 28 separated by a predetermined distance from each other in the direction of the head width thereof. As a result, the magnetic recording head 20 thus assembled according to the first embodiment of the present invention has eight pieces of the magnetic recording head elements 28, 28, . . . , 28 in total, as illustrated in FIG. 2.

Any two magnetic recording head elements 28, 28 adjacent in the direction of lamination via an insulating layer 24 are made share one common layer of insulating layer 24. As a result, the magnetic recording head 20 is composed by alternately laminating five layers of insulating layers 24, 24, . . . , 24 and four layers of magnetic film layers 25, 25, . . . , 25 between the bottom non-magnetic substrate 22 and the upper non-magnetic substrate 23, more specifically such as "the bottom nonmagnetic substrate 22-insulating layer 24-magnetic film layer 25-insulating layer 24-magnetic film layer 25-insulating layer 24- . . . -insulating-layer 24-the upper nonmagnetic substrate 23", as shown in FIG. 2.

As to a positional relationship between each magnetic recording head elements 28, 28, . . . , 28 in the magnetic recording head layers 21, 21, . . . laminated as described above, adjacent elements in the direction of the lamination are formed such that their edge lines approximately match with each other. As a result, a pitch $P_1$ of the laminated magnetic recording head elements 28, 28, . . . , in the head width direction is formed approximately equal to the width ($W_1 = 1$ μm) of the magnetic recording head elements 28, 28, . . . , hence $P_1 = W_1$ (see FIG. 2).

Further, a distance $\omega_1$ between the two magnetic recording head elements 28 and 28 in a similar magnetic recording head layer 21 is formed to be $\omega_1=3$ µm. As a result, the magnetic recording head element 28 on the left-hand side in the uppermost magnetic recording head layer 21 and the magnetic recording head element 28 on the right-hand side in the bottom magnetic recording head layer 21 are positioned such that they do not overlap in the direction of lamination and that their edge lines on either side nearest to the other are linearly aligned in the direction of lamination (see FIG. 2).

Accordingly, all of the eight pieces of the magnetic recording head elements 28, 28, . . . , 28 in the magnetic recording head 20 thus constructed are ensured to be positioned without overlapping in the direction of lamination.

Further, as this magnetic recording head 20 is fabricated using the thin film process, and if an alignment error between any two adjacent magnetic recording head elements 28 and 28 in the direction of lamination is assumed to be 0.05 µm, a maximum alignment error between the bottom magnetic recording head element 28 and the uppermost magnetic recording head element 28 can be suppressed to:

$$4\times0.05 \text{ µm}=0.2 \text{ µm}.$$

Still further, because the two magnetic recording head elements 28, 28 in a similar magnetic recording head layer 21 are formed with a same mask, there is almost no alignment error between these two magnetic recording head elements 28, 28.

Therefore, a problem of the alignment errors that must be considered among these eight pieces of the magnetic recording head elements 28, 28, . . . , 28 is only in the direction of the lamination. According to the magnetic recording head 20 of this first embodiment of the present invention, as described above, a ratio of displacement relative to the width of $W_1=1$ µm of the magnetic recording head element 28 can be suppressed within 20%, which is within a range that does not affect the recording of recording tracks Tr, Tr, . . . . In addition, in order to increase the number of channels, instead of merely increasing the number of laminations, it is possible to increase the number of magnetic recording head elements 28, 28 formed within a similar magnetic recording head layer 21, thus an overall positional accuracy (alignment accuracy) among each of magnetic recording head elements 28, 28, . . . , 28 can be further improved, thereby enabling to record a narrower record track Tr than the conventional one, and correspond to the demand for an ever increasing number of channels.

By way of example, in the above description, an allowable range of the ratio of displacement relative to the head width $W_1$ was set to be 20%, however, this is only one example, and it may be arranged also such that if its allowable range is large, the number of laminations may be increased, conversely, if its allowable range is small, the number of laminations may be reduced.

The magnetic recording head 20 thus assembled is mounted on the rotary drum 12 so that a direction of scanning thereof with respect to the tape-form recording medium 4 coincides with the direction of the lamination described above (refer to FIG. 4).

Figure 5:
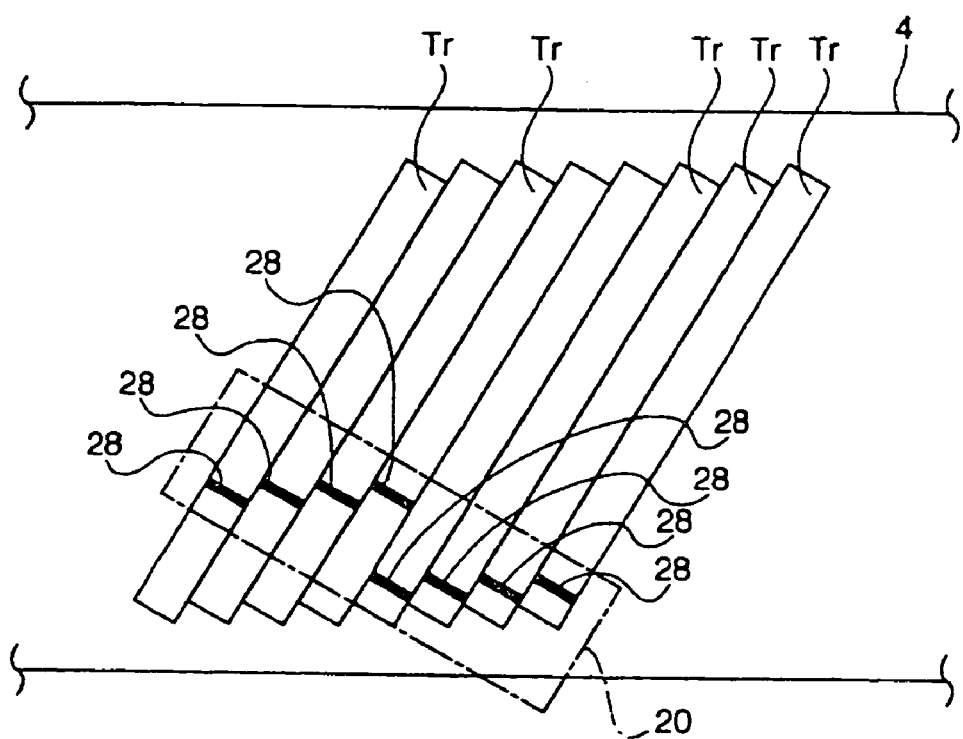
FIG. 5 is a schematic diagram indicating a positional relationship between recording tracks and the magnetic recording head.

Hence, according to the magnetic recording head 20 of the present invention described above, there have been accomplished such advantages that the width of each of magnetic recording head elements 28, 28, . . . , 28 can be reduced, and alignment errors between each of magnetic recording head elements 28, 28, . . . , 28 can be minimized, thereby allowing for the magnetic recording head 20 to record a narrower and higher density record track, implementing an enhanced multi-channeling with a further increased number of channels (see FIG. 5).

Further, in the first exemplary preferred embodiment of the present invention described above, among the four pieces in lamination of the magnetic recording head elements 28, 28, . . . , 28, any two magnetic recording head elements 28 and 28 adjacent in the direction of lamination share a common insulating layer 24 therebetween, thereby allowing to omit one of the lamination processes, hence realizing a cost reduction in the manufacture.

In the description of the first exemplary preferred embodiment of the present invention, the magnetic recording head 20 is described by way of example in which the magnetic recording head elements 28, 28, . . . , are laminated in the number of four, however, the number of laminations thereof is not limited thereto, and it may be two, three or any number, provided that a final alignment error between the laminated magnetic recording head elements 28, 28, . . . is within an allowable range.

Further, the above magnetic recording head 20 is described by way of example, in which the four layers of magnetic recording head layers 21, 21, . . . , 21 are formed so as to be hold between the upper and the bottom non-magnetic substrates 22 and 23, however, this example is directed to a magnetic recording head suitable for use with the tape-form recording medium 4, and in the case for use with a disk-shaped recording medium, it may be arranged such that the aforementioned insulating layers 24, 24, and magnetic recording head layers 21, 21, . . . are alternately laminated on one common non-magnetic substrate.

Still further, although in the above description of the first embodiment of the present invention, it is set forth that the magnetic recording head elements 28, 28 adjacent in the direction of lamination are formed such that their left and right edge portions match, it is not limited to such configuration, so that the edge portions may be arranged to partially overlap. As a result, a recording track can be formed narrower than the head width of the magnetic recording head element 28. In this case, it is arranged such that a magnetic recording head element 28 on the left side in the uppermost layer and a magnetic recording head element 28 on the right side in the bottom layer do not overlap as viewed from the direction of lamination, and both edge portions thereof are disposed so as to match or be slight separated from each other. Because recording tracks Tr, Tr, . . . , are formed sequentially first by the magnetic recording head elements 28, 28 in the bottom layer, and then sequentially by other magnetic recording head elements in the upper layers, the above-mentioned arrangement is necessary in order to prevent a left edge portion of a recording track Tr formed by the magnetic recording head element 28 positioned on the right side in the bottom layer from being overwritten by the right edge portion of another recording track Tr formed by the magnetic recording head element 28 positioned on the left side in the uppermost layer.

By way of example, in the first exemplary preferred embodiment of the present invention described above, the four pieces of the magnetic recording head elements 28, 28, . . . 28 in lamination as provided in the magnetic recording head layers 21 are arranged to share a common insulating layer 24 therebetween, however, it is not limited thereto, and there may be formed individual insulating layers 24, 24 for each magnetic recording head layer 21 as well.

Figure 6:
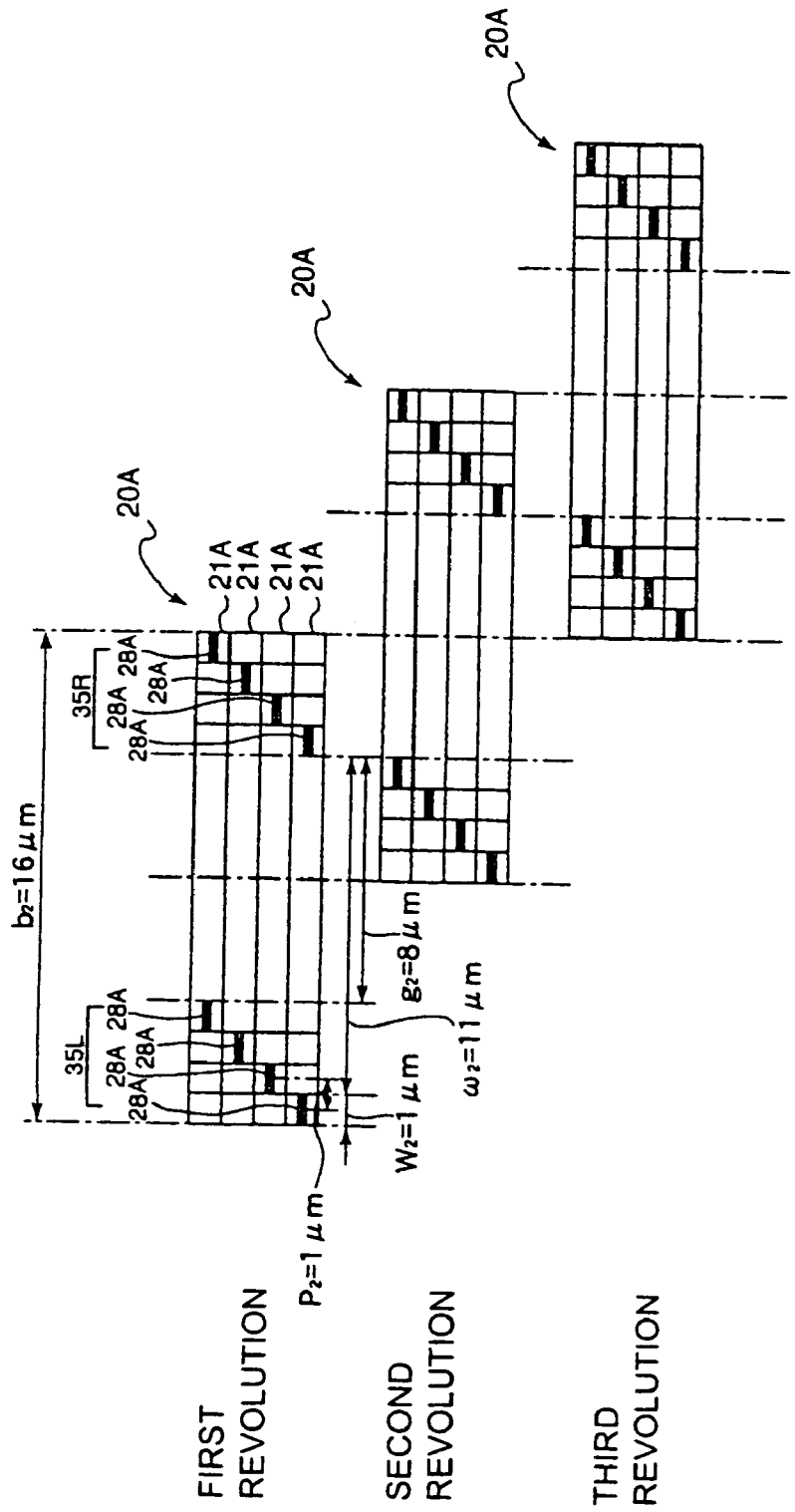
FIG. 6 shows, together with FIG. 7, a second exemplary preferred embodiment of the present invention, and in particular, it shows a schematic diagram indicating each positional relationship at a first revolution, a second revolution and a third revolution of the magnetic recording head.
Figure 7:
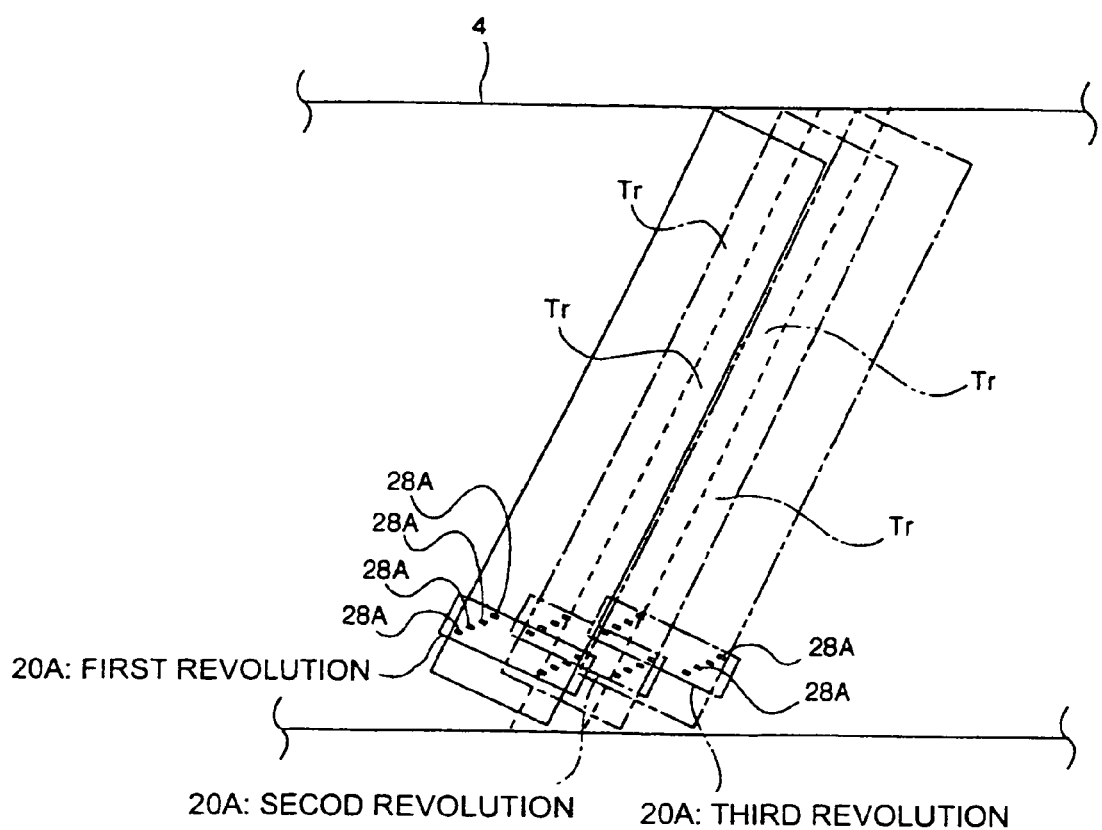
FIG. 7 is a schematic diagram indicating each positional relationship between the magnetic recording head and recording tracks at respective rounds.

A second exemplary preferred embodiment of the present invention is shown in FIG. 6 and FIG. 7. A magnetic recording head 20A according to the second embodiment of the present invention, as compared with the magnetic recording head 20 according to the first embodiment, is similar in that it has eight pieces of magnetic recording head elements, but differs in that a distance between two pieces of the magnetic recording head elements formed on a same film layer is different from that in the first preferred embodiment. This difference will be mainly described in the following, however omitting description of the other parts that are similar to the first embodiment and labeling such parts with a similar numerals.

Each magnetic recording head elements 28A, 28A, . . . , 28A in the laminated magnetic recording layers 21A, 21A, . . . , 21A are formed to have a positional relationship such that both edge lines on the adjacent side of any two pieces of the head elements 28A, 28A adjacent in the direction of lamination match. As a result, a pitch $P_2$ in the head width direction of two adjacent magnetic recording head elements 28A, 28A is approximately equal to a width ($W_2$=1 μ) of the magnetic recording head element 28A, 28A, . . . , that is, $P_2$=$W_2$ (refer to FIG. 6).

A distance $\omega_2$ between the two magnetic recording head elements 28A and 28A formed in a same magnetic recording head layer 21 is set $\omega_2$=11 μm (refer to FIG. 6).

That is, as shown in FIG. 6, eight pieces of magnetic recording head elements 28A, 28A, . . . , 28A in lamination can be divided into two groups of a left side group 35L including four pieces of the magnetic recording head elements on the left-hand side (hereinafter, referred to as the "left-side magnetic pole group") and a right side group 35R including four pieces of the magnetic recording head elements on the right-hand side (hereinafter, referred to as the "right-side magnetic pole group"). A gap $g_2$ between these two magnetic pole groups 35L and 35R is set $g_2$=8 μm, thereby providing a space to accommodate two other magnetic pole groups therebetween.

As a result, in the magnetic recording head 20A, a width $b_2$ given between the leftmost edge of a magnetic recording head element 28A and the rightmost edge of a magnetic recording head element 28A is set $b_2$=16 μm to accommodate four magnetic pole groups in total therebetween (see FIG. 6).

The magnetic recording head 20A thus formed is disposed in the notch in the rotary drum 12 likewise the magnetic recording head 20 according to the first preferred embodiment of the present invention.

Then, when the rotary drum 12 makes one revolution, each of the magnetic pole groups 35L and 35R are made scan at respective positions displaced from each other by a distance corresponding to two unit widths of the magnetic groups 35R and 35L as indicated in FIG. 7.

As a result, the magnetic recording head 20A is assured to form recording tracks Tr, Tr, . . . , Tr in a lateral direction of the recording track Tr without guard band after making three revolutions (refer to FIG. 7).

Also, in the magnetic recording head 20A according to this second embodiment of the present invention, likewise the case of the magnetic recording head 20 according to the first preferred embodiment, because that a width of each of the magnetic recording head elements 28A, 28A, . . . can be reduced and that an alignment error between each of the magnetic recording head elements 28A, 28A, . . . can be minimized, narrower recording tracks with higher density can be formed, thereby permitting realizing a magnetic recording head 20A able to respond to increasing multi-channeling.

Figure 8:
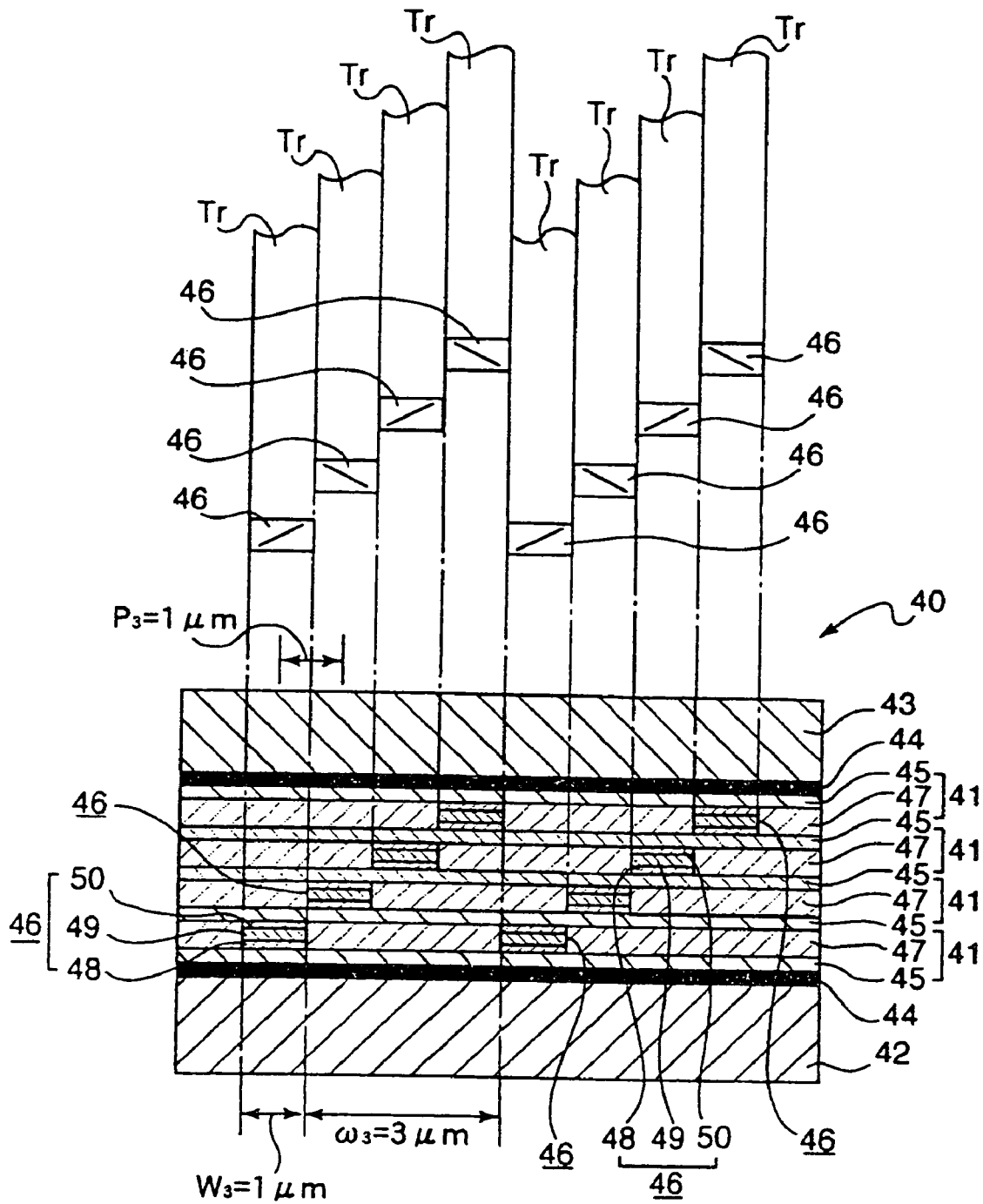
FIG. 8 shows, together with FIGS. 9 and 10, a third exemplary preferred embodiment of the present invention, and in particular, it shows a relationship between a magnetic reproducing head and recording tracks.
Figure 9:
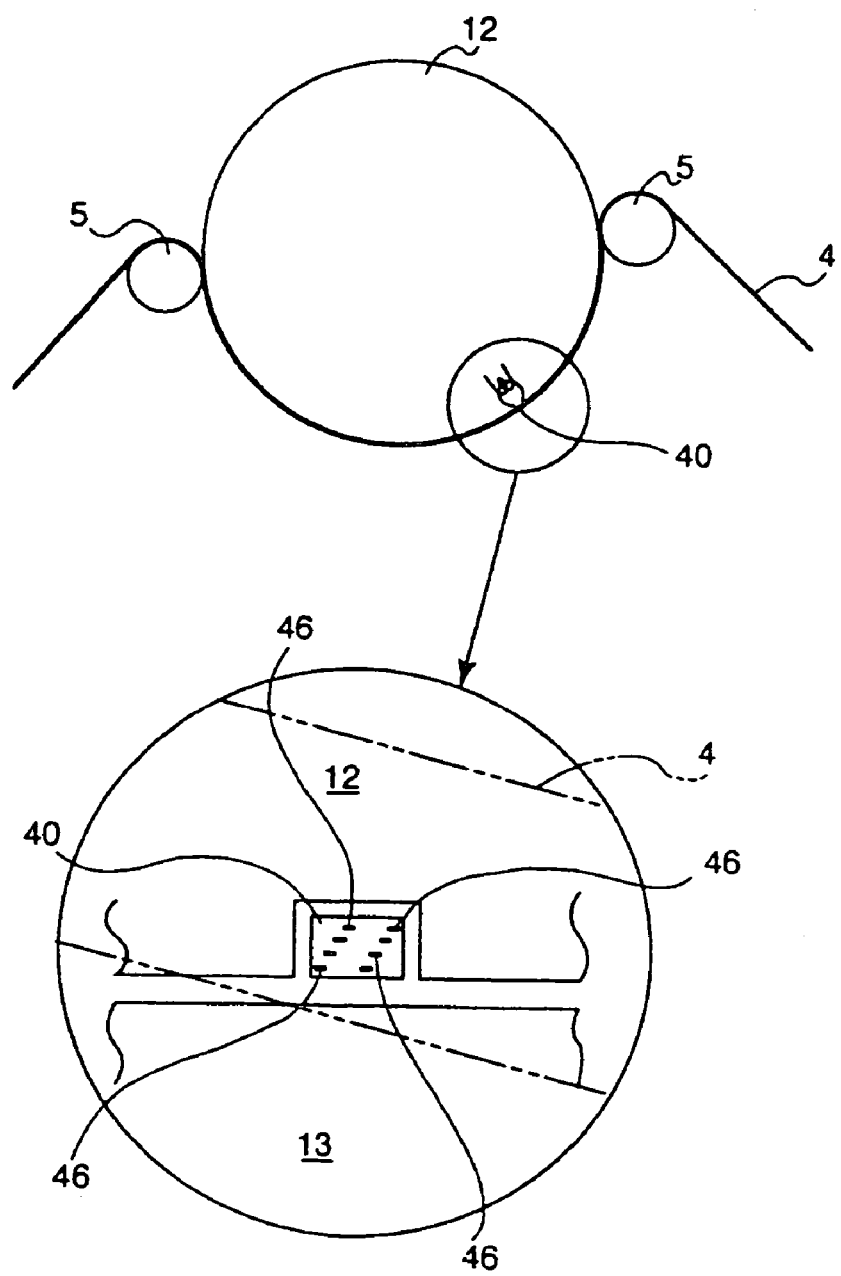
FIG. 9 is a schematic plan view of a rotary drum.
Figure 10:
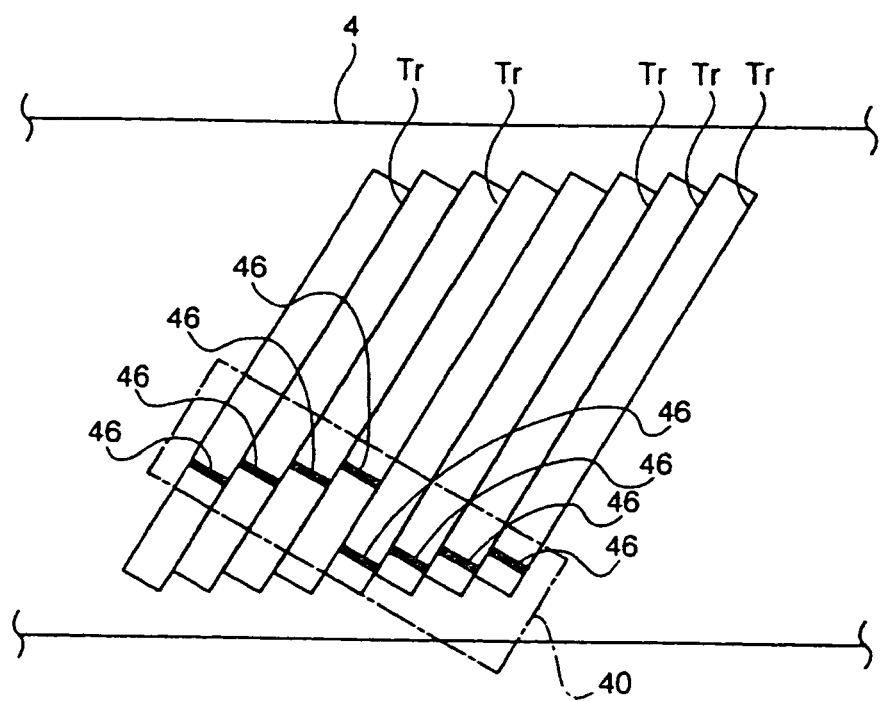
FIG. 10 is a schematic diagram indicating a positional relationship between recording tracks and the magnetic reproducing head.

A third exemplary preferred embodiment of the present invention is shown in FIGS. 8 to 10, as applied to a magnetic reproducing head having eight pieces of magneto-resistive effect thin film heads (hereinafter referred to as MR head).

It should be noted that the arrangement of MR heads in a magnetic reproducing head 40 according to this third preferred embodiment of the present invention is almost a similar as the arrangement of the magnetic recording head elements 28, 28, . . . , 28 in the magnetic recording head 20 according to the first preferred embodiment of the present invention.

FIG. 8 shows a schematic diagram of an enlarged view of the magnetic reproducing head 40 as a frontal view in contact with a tape-form recording medium 4.

By referring to FIG. 8, the magnetic reproducing head 40 is formed by interposing four layers of magnetic reproducing head layers 41, 41, . . . , 41 between two non-magnetic substrates 42, 43 and also between two insulating layers 44, 44 from the upper and the bottom directions.

More specifically, it is formed by laminating the insulating layer 44 on the bottom non-magnetic substrate 42, a plurality of magnetic reproducing head layers 41, 41, . . . on the insulating layer 44, the upper insulating layer 44 thereon, and finally the upper non-magnetic substrate 43 (refer to FIG. 8).

Further, each of the plurality of magnetic reproducing head layers 41 includes two magnetic shielding layers 45, 45; a MR head (corresponding to a magnetic reproducing head element) interposed between the two magnetic shielding layers 45, 45; and hard films 47, 47 which are positioned in a similar layer as the MR head 46 and firmly hold the MR head 46 from both sides thereof. The hard film 47, by firmly holding the MR head 46 from the both sides thereof, gives a horizontal bias to the MR head 46, as shown in FIG. 8.

Further, each MR head 46 includes sequentially laminating, from the bottom, a SAL (soft adjacent layer) film 48, an intermediate separation film (insulating film) 49, and a magneto-resistive effect film (MR element) 50, as shown in FIG. 8. As the MR head 46 is fabricated by a thin film processing, its width $W_3$ can be formed, for example, $W_3$=1 μm.

In the magnetic reproducing head lamination layer 41 there are disposed two pieces of MR head 46, 46 in the head width direction separated from each other by a predetermined distance. As a result, the magnetic reproducing head 40 thus assembled has eight pieces of MR heads 46, 46, . . . , 46 in total, as shown in FIG. 8.

Any two pieces of the MR heads 46, 46 adjacent via a magnetic shielding layer 45 in the direction of lamination are arranged so as to share one layer of a common magnetic shielding layer 45 existing therebetween. As a result, the magnetic reproducing head 40 is formed by alternately laminating five magnetic shielding layers 45, 45, . . . , 45 and four pieces of MR heads 46, 46, . . . , 46 or hard films 47, 47, . . . , 47, such as "the bottom nonmagnetic substrate 42-insulating layer 44-magnetic shielding layer 45-MR head 46 or hard film 47-magnetic shielding layer 45-MR head 46 or hard film 47-magnetic shielding layer 45-. . . -magnetic shielding layer 45-insulating layer 44-the upper nonmagnetic substrate 43", as shown in FIG. 8.

A positional relationship between each MR heads 46, 46, . . . , 46 in the magnetic reproducing head layers 41, 41, . . . , 41 in lamination is arranged such that both edge lines on their adjacent side of any two MR heads 46, 46 adjacent in the direction of lamination are formed so as to approximately match. As a result, a pitch P3 in the direction of a head width of MR heads 46, 46, . . . , 46 formed in lamination is approximately equal to the width thereof ($W_3 = 1$ μm).

In addition, a distance $\omega_3$ between the two MR heads 46, 46 formed in a similar magnetic reproducing head layer 41 is set $W_3 = 3$ μm. As a result, a MR head 46 on the left side in the uppermost magnetic reproducing head layer 41 and a MR head 46 on the right side in the bottom magnetic reproducing head layer 41 are formed in such a manner that they do not overlap with each other as viewed from the direction of lamination, and that both edge lines closer to each other are aligned in the direction of lamination, as shown in FIG. 8.

As a result, all of the eight pieces of the MR heads 46, 46, . . . , 46 formed as laminated in the magnetic reproducing head 40 are displaced not to overlap in the direction of lamination.

Further, the magnetic reproducing head 40 which is fabricated by the thin film process has such an advantage that if an alignment error between any two MR heads 46 and 46 adjacent in the direction of lamination is 0.05 μm, a maximum alignment error induced between the uppermost MR head 46 and the bottom MR head 46 may be suppressed to be within $$4 \times 0.05 \text{ μm} = 0.2 \text{ μm}.$$

In addition, because the MR heads 46, 46 in a similar layer are formed using a same mask, almost no alignment error is originated therebetween.

Therefore, a problem of alignment errors that must be considered between these eight pieces of MR heads 46, 46, . . . , 46 resides only in the direction of lamination of those MR heads. According to the magnetic reproducing head 40 of the third exemplary preferred embodiment of the present invention, a ratio of displacement relative to a width $W_3 = 1$ μm of the MR head 46 can be suppressed within 20% as described above, which is within an allowable range without affecting reproduction of the recording tracks Tr, Tr, . . . , Tr.

In addition, if an increase in the number of channels is required, by increasing the number of MR heads 46, 46 . . . to be formed in a similar magnetic reproducing layer 41 instead of increasing the number of lamination, the positional accuracy among MR heads can be further improved, thereby enabling to reproduce a narrower recording track than conventional, and to implement an increased multi-channeling with an increased number of channels.

Hereinabove, it is described that the allowable range of displacement relative to the head width of the MR head 46 is 20%, however, it is only an example, and not limited thereto. If its allowable range is large, the number of lamination can be increased, conversely, if its allowable range is narrow, the number of lamination can be decreased accordingly.

The magnetic reproducing head 40 assembled as described above is mounted on the rotary drum 12 so that its scanning direction on the tape-form recording medium 4 coincides with the direction of lamination thereof, as shown in FIG. 9.

Hence, according to the magnetic reproducing head 40 described above, the width of MR heads 46, 46, . . . , 46 can be reduced and the alignment error between MR heads can be minimized, thereby enabling to reproduce information from a narrower recording track with higher density, and hence realizing magnetic reproducing head 40 featuring a multi-channeling capability with an increased number of channels, as shown in FIG. 10.

In other words, in the case where, for example, a track width of each of the eight recording tracks Tr, Tr, . . . , Tr recorded on the tape-form recording medium 4 is equal to a track pitch, that is, even if the recording tracks Tr, Tr, . . . , Tr are formed densely packed without guard band therebetween, it is allowed for each of the eight pieces of the MR heads 46, 46, . . . , 46 to scan responding to each of the recording tracks Tr, Tr, . . . , Tr, individually, as shown in FIG. 10.

Further, according to the third preferred embodiment of the present invention, any two MR heads 46, 46 adjacent in the direction of lamination of the four pieces of the MR heads 46, 46, . . . , 46 on either sides of the lamination are arranged to share a common magnetic shielding layer 45 therebetween, one of the lamination processes can be omitted thereby reducing the cost of manufacture.

Further, although not indicated in the figures, according to this magnetic reproducing head 40 of the third preferred embodiment, as the plurality of MR heads 46, 46 are formed in a similar magnetic reproducing head layer, it is possible to form electric circuits of these MR heads 46, 46 simultaneously in its lamination process, as well as to share a common electric circuit therebetween, hence simplifying the structure.

The third preferred embodiment of the present invention described above has been set forth by way of example of the magnetic reproducing head 40 in which four layers of the magnetic reproducing head layers embedding four pieces of MR heads 46, 46, . . . , 46 on both sides thereof are laminated, however, the number of laminations is not limited thereto, so that it may be two, three or any number, provided that the alignment error between the MR heads 46, 46, . . . , 46 falls within its allowable range.

Further, the above magnetic reproducing head 40 is described by way of example, in which the magnetic reproducing head layers 41, 41, . . . , 41 are formed as sandwiched between the upper and the lower nonmagnetic substrates 42 and 43, the arrangement of which is suitable as a magnetic reproducing head for use with a recording medium in tape form, however, it is not limited thereto, and in the case for use with a disk-shaped recording medium, its magnetic reproducing head may be comprised by laminating the aforementioned magnetic shielding layers 45, 45, . . . , 45, and magnetic reproducing head layers 41, 41, . . . , 41 alternately on one common nonmagnetic substrate.

Still further, according to the third preferred embodiment of the present invention described above, any two MR heads 46 and 46 adjacent in the direction of lamination are formed so that the left edge line of the one on the right-hand side and the right edge line of the other on the left-hand side are aligned in the direction of lamination, however, it is not limited thereto, and both edge portions adjacent may be formed partially to overlap as well. Depending on how the recording tracks Tr, Tr, . . . , Tr are formed on the tape-form recording medium 4, MR heads 46, 46, . . . , 46 may be formed corresponding thereto. By way of example, if the MR heads 46, 46, . . . , 46 are formed partially to overlap in the magnetic reproducing head 40, a non-tracking reproduction described in the magnetic reproducing head according to its third preferred embodiment disclosed in the aforementioned JP-A Laid-Open No. 2000-348377 can be achieved.

Figure 11:
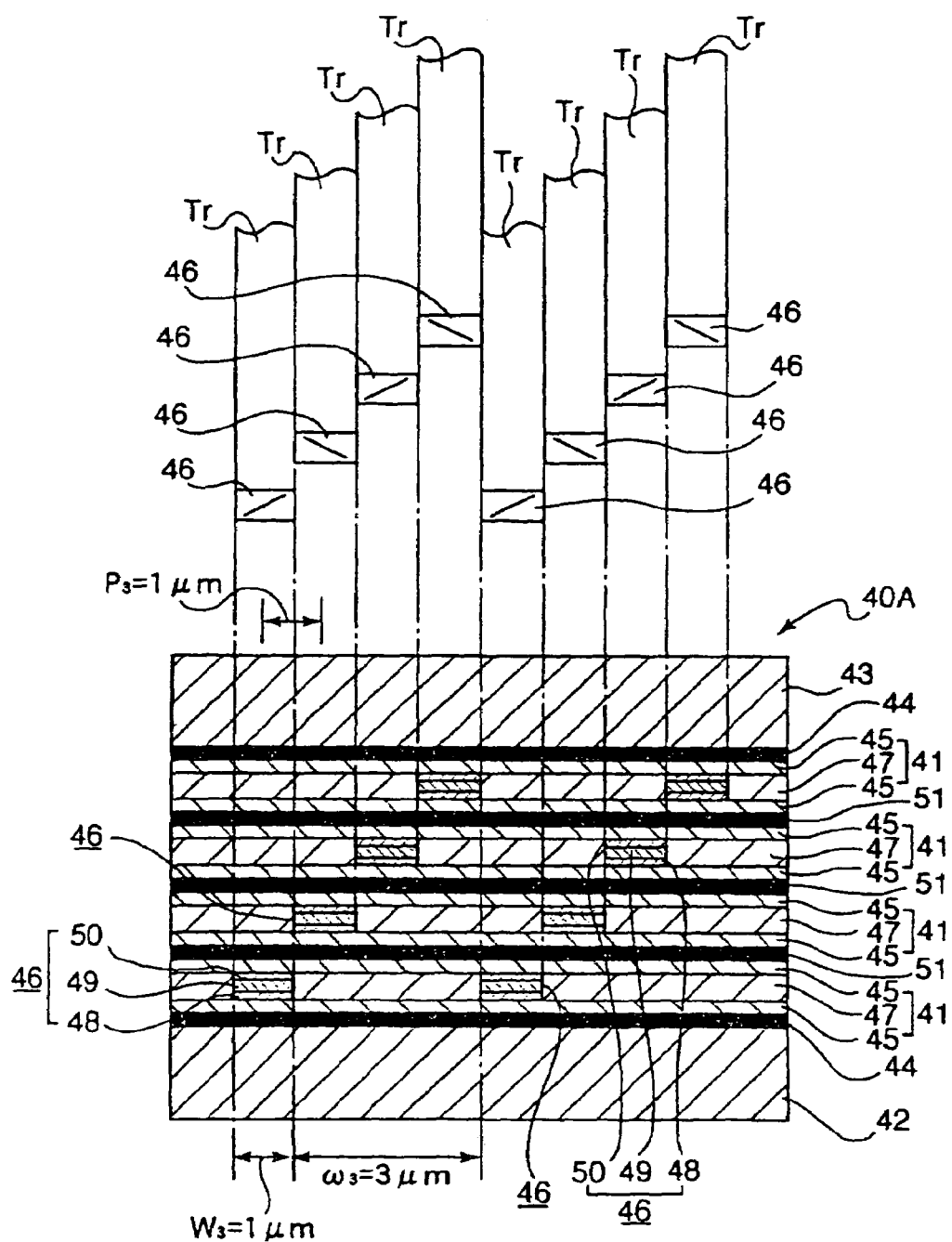
FIG. 11 shows a modified version of the magnetic reproducing head according to the third embodiment of the present invention, and in particular, it shows a positional relationship between its magnetic reproducing head and recording tracks.

With reference to FIG. 11, a modified version of the magnetic reproducing head 40 according to the third preferred embodiment of the present invention described above is shown. A magnetic reproducing head 40A according to this modified version includes further forming an intermediate insulating layer 51 between the magnetic reproducing head layers 41 and 41.

That is, the magnetic reproducing head 40A is formed by alternately laminating four layers of magnetic reproducing layers 41, 41, . . . , 41 and three layers of intermediate insulating layers 51, 51, . . . , 51, for example, such as "a bottom nonmagnetic substrate 42-insulating layer 44-magnetic reproducing head layer 41-intermediate insulating layer 51-magnetic reproducing head layer 41-intermediate insulating layer 51-magnetic reproducing head layer 41-intermediate insulating layer 51-magnetic reproducing head layer 41-insulating layer 44-upper nonmagnetic substrate 43", as shown in FIG. 11.

In other words, unlike the magnetic reproducing head 40 according to the third preferred embodiment of the present invention, in which the magnetic shielding layers 45, 45., are shared between the two magnetic reproducing head layers 41, 41 adjacent in the direction of lamination, because there is provided an intermediate insulating layer 51 between any two MR heads 46 and 46 adjacent in the direction of lamination, a crosstalk between these two MR heads 46, 46 may be eliminated, thereby enabling to achieve further higher density recording and reproducing of information.

Figure 12:
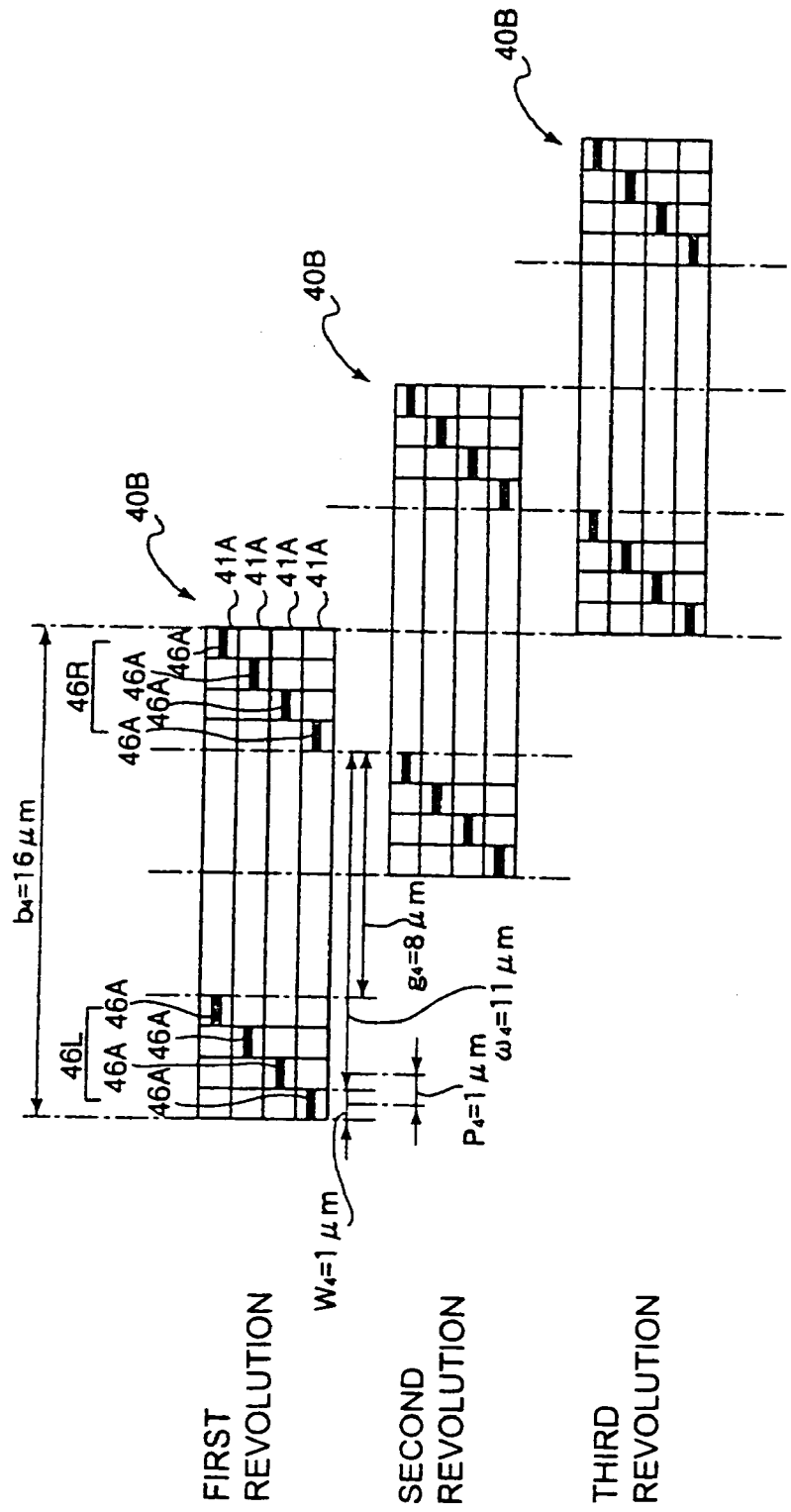
FIG. 12 shows, together with FIG. 13, a fourth embodiment of the present invention, and in particular, it depicts each positional relationship at a first, a second and a third revolutions of the magnetic reproducing head.
Figure 13:
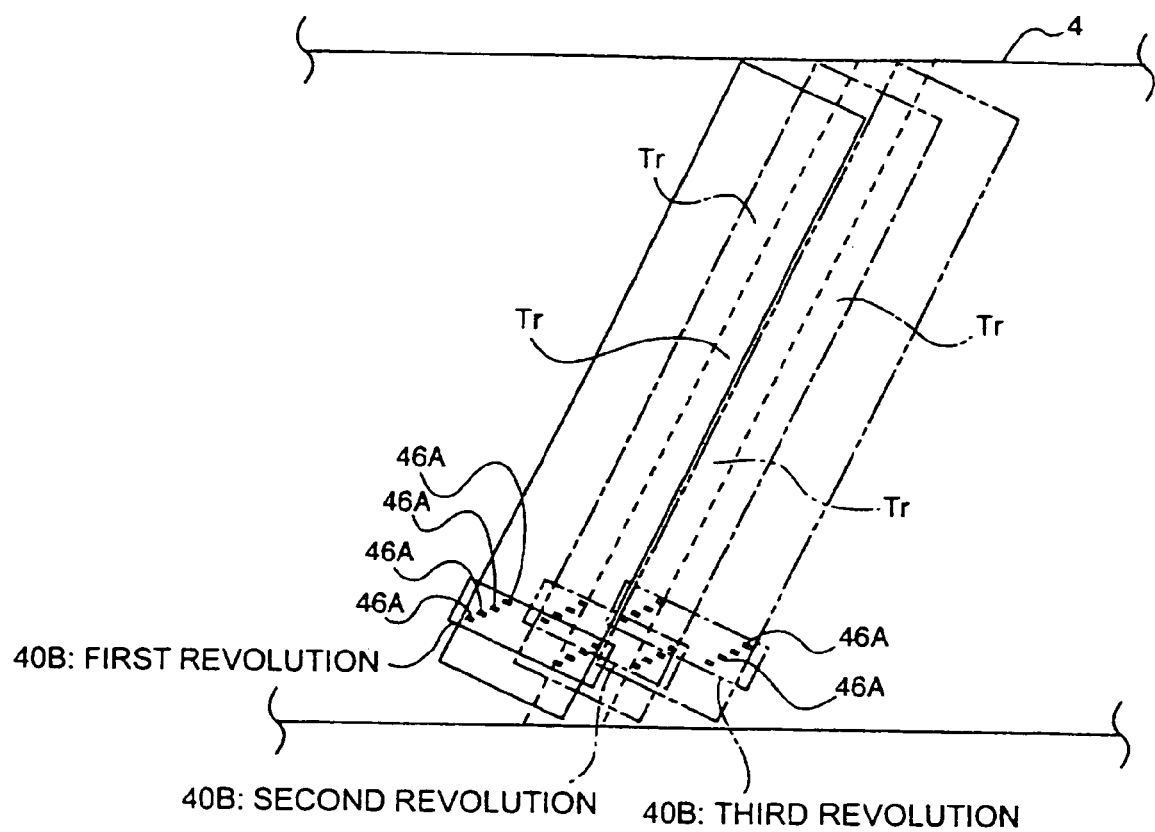
FIG. 13 is a schematic diagram indicating a positional relationship between the magnetic recording head and the recording tracks at each revolution.

With reference to FIG. 12 and FIG. 13, a fourth preferred embodiment of the present invention is be described as follows. A magnetic reproducing head 40B according to the fourth preferred embodiment of the present invention is similar to the magnetic reproducing head 40 according to the first preferred embodiment of the present invention in that there are provided eight pieces of MR heads, however, it differs in that a distance between two MR heads formed in a same film layer is different therefrom. This difference will be described specifically in the following, omitting description of the other portions which are a similar or similar as in the magnetic reproducing head 40 according to the third preferred embodiment, and labeled with the same numerals.

It should be noted that the arrangement of MR heads 46A, 46A, . . . , 46A in the magnetic reproducing head 40B according to the fourth preferred embodiment of the present invention is approximately a similar as that of the magnetic recording head elements 28A, 28A, . . . , 28A in the magnetic recording head 20A according to the second preferred embodiment of the present invention as shown in FIG. 12.

A positional relationship of the MR heads 46A, 46A, . . . , 46A in the magnetic reproducing head layers 41A, 41A, . . . , 41A as laminated is arranged such that both edge lines on their adjacent side of any two MR heads 46A, 46A adjacent in the direction of lamination are formed to approximately match with each other, thereby a pitch $P_4$ in the head width direction between the centers of any two adjacent MR heads 46A, 46A is formed approximately equal to a width of the head ($W_4$=1 µm), hence $P_4$=$W_4$, as shown in FIG. 12.

Furthermore, a distance $\omega_4$ between the two pieces of MR heads 46A and 46A formed in a similar magnetic reproducing layer 41A is set that $\omega_4$=11 µm, as shown in FIG. 12.

That is, the eight pieces of the MR heads 46A, 46A, . . . , 46A as laminated are divided into two groups of 46L which includes four pieces of MR heads on the left-hand side (hereinafter, referred to as the left-side MR head group) and 46R which includes the other four pieces of MR heads on the right-hand side (hereinafter, referred to as the right-side MR head group). Here, it should be noted that the distance $g_4$ between these two MR head groups 46L and 46R is set $g_4$=8 µm, thereby securing a space to accommodate two more MR head groups therebetween, as shown in FIG. 12.

As a result, the magnetic reproducing head 40B has a width $b_4$ ($b_4$=16 µm) extending from its leftmost edge to its rightmost edge so as to accommodate four groups of MR heads therebetween, as shown in FIG. 12.

The magnetic reproducing head 40B thus formed is disposed in the notch of the rotary drum 12 in a similar manner as the magnetic reproducing head 40 according to the first preferred embodiment.

When the rotary drum 12 makes one revolution, the MR head groups 46L and 46R are made scan a position on the recording tracks Tr, Tr, . . . , Tr displaced by a amount corresponding to a width of two MR head groups of 46L and 46R, as indicated in FIG. 13.

As a result, when the rotary drum 12 makes three revolutions, the magnetic reproducing head 40A is made reproduce the whole recording tracks Tr, Tr, . . . , Tr which are densely packed without guard band in the width direction thereof, as shown in FIG. 12 and FIG. 13.

Figure 14:
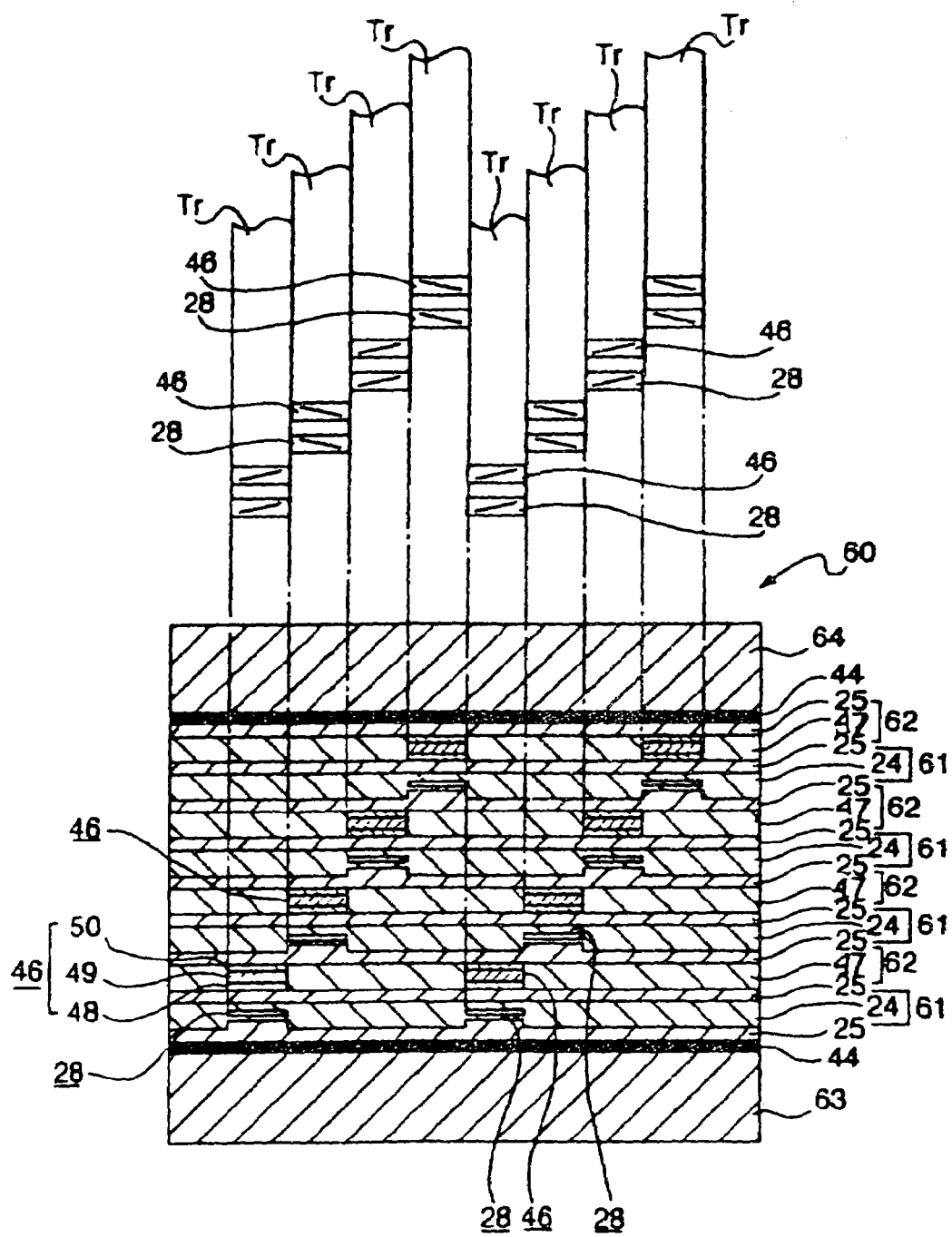
FIG. 14 shows a fifth embodiment of the present invention, and in particular, it shows a diagram indicating a relationship between its magnetic head and recording tracks.

With reference to FIG. 14, a fifth preferred embodiment of the present invention is shown, which is applied to a magnetic head which has eight pieces of MR heads and eight pieces of magnetic recording head elements.

FIG. 14 is a schematic diagram showing an enlarged portion of a magnetic head 60 according to a fifth preferred embodiment of the present invention, as a frontal view having contact with a tape-form recording medium 4.

The magnetic head 60 is formed by alternately laminating four layers of magnetic recording head layers 61, 61, . . . , 61 and four layers of magnetic reproducing head layers 62, 62, . . . , 62 on a bottom nonmagnetic substrate 63, then an upper nonmagnetic substrate 64 on an uppermost magnetic reproducing head layer 62.

By way of example, each magnetic recording head layer 61 described above has a similar structure as that in the first preferred embodiment, and each magnetic reproducing head layer 62 described above has a similar structure as that in the third preferred embodiment.

In addition, each magnetic recording head elements 28, 28 in a magnetic recording head layer 61 and each MR heads 46, 46 in a magnetic reproducing head layer 62 immediately thereon are formed to match with each other in a positional relationship as viewed from the direction of lamination.

As a result, in the direction of the head width, each of two magnetic recording head elements 28, 28 in the magnetic recording head 61 and each of two MR heads 46, 46 in the magnetic reproducing head layer 62 laminated on the layer 61 are disposed corresponding to each other, forming a pair, as shown in FIG. 14.

As a result, according to the magnetic head 60 laminated as described above, a width of each magnetic recording head elements 28, 28, . . . , 28 and each MR heads 46, 46, . . . , 46 can be reduced, and also, an alignment error between each magnetic recording head elements 28, 28, . . . , 28 and each MR heads 46, 46, . . . , 46 can be minimized. As a consequence, recording and reproducing of information to and from narrower recording tracks with higher density are enabled, thereby providing an improved multi-channeling capability to the magnetic head 60.

Further, according to the fifth preferred embodiment of the present invention described above, because a pair of a magnetic recording head element 28 and a MR head 46 reside in the magnetic recording head layer 61 and the magnetic reproducing head layer 62 adjacent in the direction of lamination, both of the pair can be formed in closest proximity, thereby enabling to minimize an alignment error in the direction of the head width for the pair of the magnetic recording head element 28 and the MR head 46 to the least.

Figure 15:
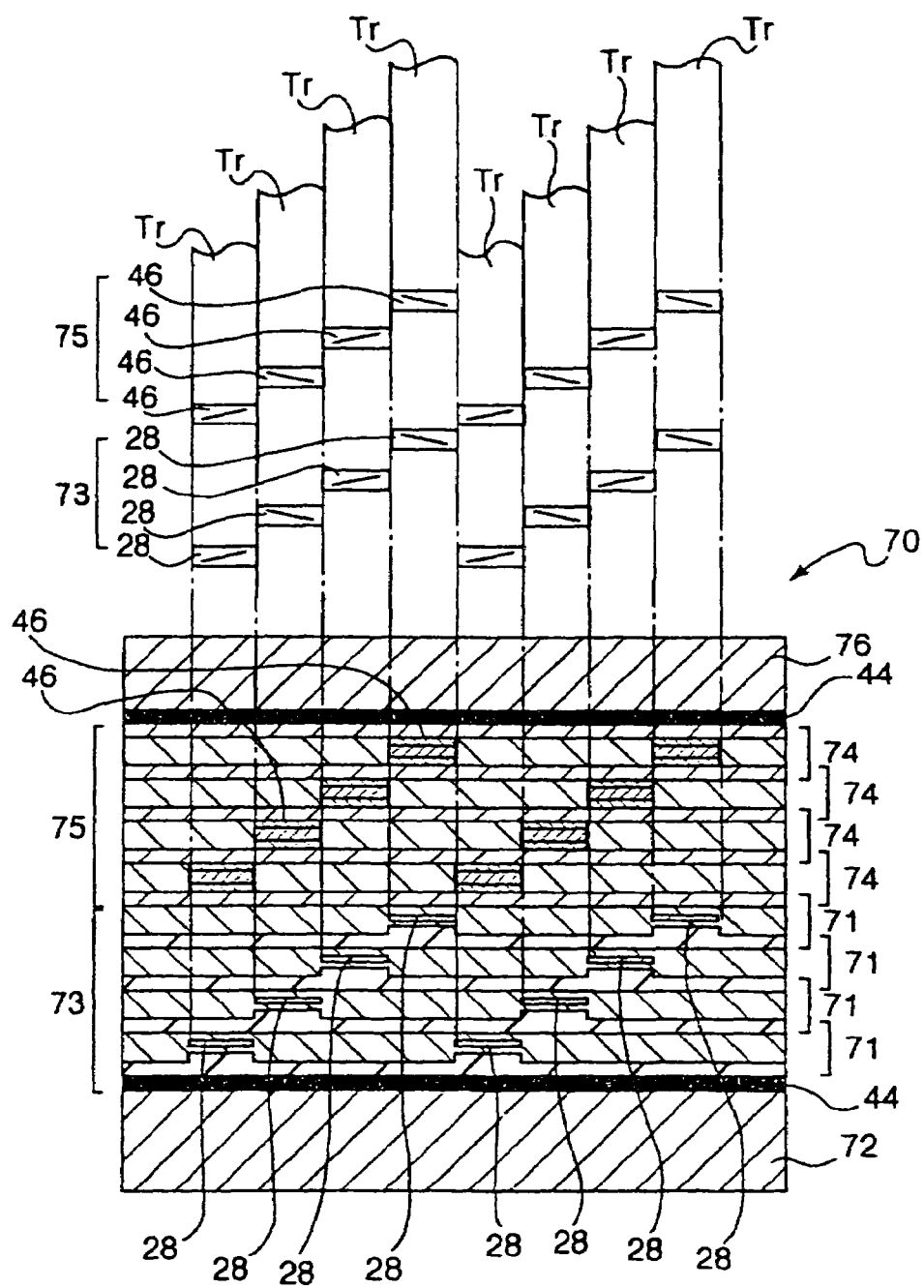
FIG. 15 shows a sixth embodiment of the present invention, and in particular, it shows a diagram indicating a relationship between its magnetic head and recording tracks.

With reference to FIG. 15, a sixth preferred embodiment of the present invention is shown, which is applied to a magnetic head which has eight pieces of MR heads and eight pieces of magnetic recording head elements.

FIG. 15 is a schematic diagram of a magnetic head 70 according to the sixth preferred embodiment, and shows a frontal view in enlargement as a frontal view having contact with a tape-form recording medium 4.

The magnetic head 70 is formed by sequentially laminating four layers of magnetic recording head layers 71, 71, . . . , 71 to form a magnetic recording head layer group 73 on a bottom nonmagnetic substrate 72, then sequentially laminating four layers of magnetic reproducing head layers 74, 74, . . . , 74 to form a magnetic reproducing head layer group 75 on the magnetic recording head layer group 73, and laminating an upper nonmagnetic substrate 76 on the magnetic reproducing head layer group 75.

By way of example, each magnetic recording head layer 71 has a similar structure as that in the first preferred embodiment, and each magnetic reproducing head layer 74 has a similar structure as that in the third preferred embodiment of the present invention.

Further, a positional relationship between each magnetic recording head elements 28, 28, . . . , 28 in the magnetic recording head layer group 73 is similar to that between each magnetic recording head elements 28, 28, . . . , 28 in the magnetic recording head 20 according to the first preferred embodiment, and further, a positional relationship between each MR heads 46, 46, . . . , 46 in the magnetic reproducing head layer group 75 is similar to that between the each MR heads, 46, 46, . . . , 46 in the magnetic reproducing head 40 according to the third preferred embodiment of the present invention.

As a result, magnetic recording head elements 28, 28 in each magnetic recording head layer 71 in the magnetic recording head layer group 73 and MR heads 46, 46 in each magnetic reproducing head layer 74 in the magnetic reproducing head layer group 75 are formed in a same relative position in the head width direction, forming respective pairs in a vertical direction, as shown in FIG. 15.

As a result, advantageously, according to the magnetic head 70 thus fabricated, widths of each magnetic recording head elements 28, 28, . . . , 28 and of each MR heads 46, 46, . . . , 46 can be minimized, and also an alignment error between each magnetic recording head elements 28, 28, . . . , 28 as well as each MR heads 46, 46, . . . , 46 can be minimized, thereby enabling to record and reproduce information to and from a narrower and higher density recording track, and thereby providing an improved multi-channeling capability to the magnetic head 70.

Still further, according to the sixth preferred embodiment of the present invention, after laminating a plurality of the magnetic recording head layers 71, 71, . . . , 71, a plurality of the magnetic reproducing head layers 74, 74, . . . , 74 are laminated thereon, thereby enabling to simplify the manufacturing process.

That is, because an environment of the process such as temperature differs between the manufacturing of the magnetic recording head layers and manufacturing of the magnetic reproducing head layers, if it is made set up a different process environment after completion of the manufacture of the magnetic recording head layers for starting the lamination of magnetic reproducing head layers, alteration of process environment can be reduced to one time, thereby enabling to simplify the manufacturing process.

Figure 16:
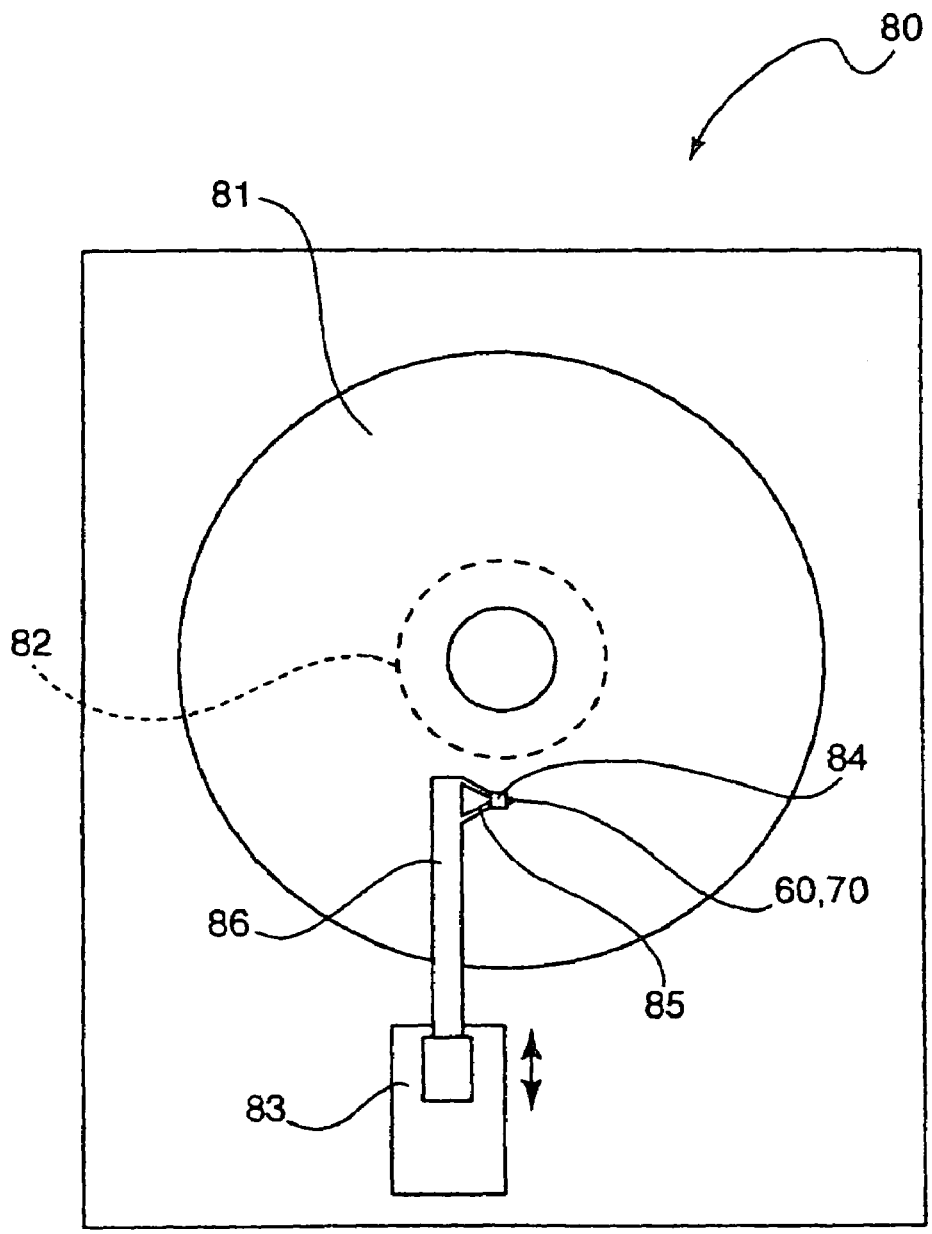
FIG. 16 is a schematic plan view of a disk drive.

FIG. 16 is a plan view showing a schematic diagram of a disk drive using the magnetic head 60 or 70 described above.

A disk drive 80 is provided with a drive mechanism 82 for rotating a disk-shaped recording medium 81, and a head transport mechanism 83 for transporting the magnetic head 60 or 70 in a radius direction of the disk-shaped recording medium 81, wherein the head transport mechanism 83 is comprised of a head slider 84 for supporting the magnetic head 60 or 70, a suspension 85 for allowing the head slider 84 to make an elastic contact with the disk-shaped recording medium 81, and a suspension arm 86 connected to the head transport mechanism 83 for supporting the suspension 85, as shown in FIG. 16.

When the disk-shaped recording medium 81 rotates driven by the drive mechanism 82, the magnetic head 60 or 70 supported by the head slider 84 performs recording or reproducing of a signal to and from the disk-shaped recording medium 81.

By performing the recording or reproducing of the signal to and from the disk-shaped recording medium 81 by means of the magnetic head 60 or 70 described above, it is enabled to accomplish the multi-channeling and high density recording and reproducing of the information.

Hereinabove, each exemplary preferred embodiments of the present invention have been described by way of example of the magnetic head which has the eight pieces of magnetic heads elements, however, it should be noted that the present invention is not limited thereto.

Further, in the above description of the exemplary preferred embodiments, its tape drive system has been described by way of example of a so-called helical scan tape system using the rotary drum, however, the present invention is not limited thereto, and can be applied to a linear scan tape system as well.

Furthermore, although the present invention has been described in its preferred form with a certain degree of particularity, many changes, variations, combinations and sub-combinations are possible herein. It is therefore to be understood that any modifications will be practiced otherwise than as specifically described herein without departing from the scope of the present invention.

The invention claimed is:

1. A magnetic head for a helical scan tape drive, the head comprising a plurality of magnetic reproducing head layers each having magnetic reproducing head elements fabricated by a thin film process and interposed between two magnetic shielding layers and a plurality of magnetic recording head layers each having magnetic recording head elements fabricated by a thin film process and interposed between two insulating films, laminated on a substrate made of a non-magnetic material, and all of said magnetic reproducing head elements being displaced from each other in a head width direction constituting an orthogonal direction relative to a direction of lamination thereof, wherein said magnetic reproducing head layers include a plurality of magnetic reproducing head elements formed at a predetermined pitch and providing a space to accommodate other magnetic reproducing head element groups therebetween;

said magnetic recording head layers have a plurality of magnetic recording head elements formed at a same pitch as said plurality of magnetic reproducing head elements; and each magnetic reproducing head element and each magnetic recording head element are formed substantially at a similar position in the head width direction, forming a pair;

wherein said magnetic reproducing head layers and said magnetic recording head layers are alternately laminated, and a magnetic reproducing head element and a magnetic recording head element forming a pair are adjacent in the direction of lamination and are separated via a magnetic shielding layer and an insulating layer.

2. A helical scan tape drive provided with a magnetic head for recording and reproducing a signal to and from a recording tape, and a tape running means for running the recording tape along a predetermined running path, wherein said magnetic head comprises a plurality of magnetic reproducing head layers each having magnetic reproducing head elements fabricated by a thin film process and interposed between two magnetic shielding layers, and a plurality of magnetic recording head layers each having magnetic recording head elements fabricated by a thin film process and interposed between two insulating layers, laminated on a substrate made of a non-magnetic material, all of the magnetic reproducing head elements therein being displaced from each other in a head width direction constituting an orthogonal direction relative to a direction of lamination, and all of the magnetic recording head elements therein being displaced from each other in the head width direction;

each magnetic reproducing head layer includes a plurality of magnetic reproducing head elements formed at a predetermined pitch and providing a space to accommodate other magnetic reproducing head element groups therebetween;

each magnetic recording head layer includes a plurality of magnetic recording head elements formed at a pitch substantially similar to a pitch of the plurality of the magnetic reproducing head elements; and each magnetic reproducing head element and each magnetic recording head element are formed at a substantially similar position in the head width direction, forming a pair;

wherein said magnetic reproducing head layers and said magnetic recording head layers are alternately laminated; and said magnetic reproducing head element and said magnetic recording head element constituting the pair are adjacent in the direction of lamination and separated by an insulating layer.

* * * * *

UNITED STATES PATENT AND TRADEMARK OFFICE
CERTIFICATE OF CORRECTION

PATENT NO. : 7,324,303 B2
APPLICATION NO. : 11/653806
DATED : January 29, 2008
INVENTOR(S) : Tadashi Ozue and Yutaka Soda It is certified that error appears in the above-identified patent and that said Letters Patent is hereby corrected as shown below:

Column 1, line 20, delete "using a similar";

Column 2, line 63, "there is" should read --there are--;

Column 5, line 43, "there is" should read --there are--;

Column 6, line 30, delete "a";

Column 6, line 67, "revolutions" should read --revolution--;

Column 8, line 48, "made share" should read --made to share--;

Column 11, line 11, delete "a";

Column 11, line 14, "are formed" should read --is formed--;

Column 11, line 49, "are made" should read --is made--;

Column 11, line 50, "scan" should read --to scan--;

Column 13, line 6, "a MR" should read --an MR--;

Column 13, line 7, "and a" should read --and an--;

Column 15, line 27, delete "be";

Column 16, line 13, "made scan" should read --made to scan--.

Column 16, line 18, "made repro-" should read --made to repro- --;

UNITED STATES PATENT AND TRADEMARK OFFICE
CERTIFICATE OF CORRECTION

PATENT NO.         : 7,324,303 B2
APPLICATION NO. : 11/653806
DATED                : January 29, 2008
INVENTOR(S)       : Tadashi Ozue and Yutaka Soda It is certified that error appears in the above-identified patent and that said Letters Patent is hereby corrected as shown below:

Column 18, line 27, "having been" should read --has been--.

Signed and Sealed this

Third Day of March, 2009

JOHN DOLL
*Acting Director of the United States Patent and Trademark Office*